United States Patent
Spaur et al.

(10) Patent No.: US 7,346,370 B2
(45) Date of Patent: Mar. 18, 2008

(54) ENABLING INTEROPERABILITY BETWEEN DISTRIBUTED DEVICES USING DIFFERENT COMMUNICATION LINK TECHNOLOGIES

(75) Inventors: Charles W. Spaur, Aurora, CO (US); Axel Fuchs, San Jose, CA (US); Patrick J. Kennedy, Boulder, CO (US); Mike Lewellen, Longmont, CO (US); Jay Plucienkowski, Boulder, CO (US)

(73) Assignee: Cellport Systems, Inc., Boulder, CO (US)

( * ) Notice: Subject to any disclaimer, the term of this patent is extended or adjusted under 35 U.S.C. 154(b) by 679 days.

(21) Appl. No.: 10/836,939

(22) Filed: Apr. 29, 2004

(65) Prior Publication Data

US 2005/0245272 A1    Nov. 3, 2005

(51) Int. Cl.
*H04M 1/00* (2006.01)
(52) U.S. Cl. ............... 455/556.1; 455/99; 455/345; 340/3.1; 701/24; 701/29; 701/36; 701/200
(58) Field of Classification Search ........... 455/99, 455/414.1, 414.2, 344, 345, 426.1, 456.3, 455/457, 507, 556.1, 557; 370/401; 340/7.52, 340/7.31, 7.35, 256.14, 425.5, 438, 457, 340/539.16, 825.52, 825.72, 998; 701/1, 701/24, 29, 33, 35, 36, 48, 200, 208, 209, 701/210, 213

See application file for complete search history.

(56) References Cited

U.S. PATENT DOCUMENTS

| | | |
|---|---|---|
| 4,697,281 A | 9/1987 | O'Sullivan |
| 4,718,080 A | 1/1988 | Serrano et al. |
| 4,792,986 A | 12/1988 | Garner et al. |
| 4,837,800 A | 6/1989 | Freeburg et al. |
| 4,887,265 A | 12/1989 | Felix |
| 4,890,315 A | 12/1989 | Bendixen et al. |
| 4,972,457 A | 11/1990 | O'Sullivan |
| 4,977,609 A | 12/1990 | McClure |
| 4,989,146 A | 1/1991 | Imajo |
| 4,989,230 A | 1/1991 | Gillig et al. |
| 5,020,090 A | 5/1991 | Morris |

(Continued)

FOREIGN PATENT DOCUMENTS

DE    4032198    4/1992

(Continued)

OTHER PUBLICATIONS

Qualcomm, Wireless Business Solutions, "Presentation to the IWPC Workshop"; date unknown.

(Continued)

*Primary Examiner*—James D Edwart
(74) *Attorney, Agent, or Firm*—Sheridan Ross P.C.

(57) ABSTRACT

The present invention is directed to facilitating communications and interoperability between/among applications and services. Such applications and services may be running on or associated with disparate platforms. The apparatus of the present invention provides for a message set that can be used by services to advertise available services, and by applications to identify desired services. According to certain embodiments, applications may subscribe to available services. In a further aspect of some embodiments, applications executable on and services available from disparate platforms are not required by themselves to support communications between/among the platforms. Instead, such support may be obtained from facilities that are provided as part of the platform itself.

34 Claims, 22 Drawing Sheets

U.S. PATENT DOCUMENTS

| | | |
|---|---|---|
| 5,029,233 A | 7/1991 | Metroka |
| 5,046,187 A | 9/1991 | Takahashi |
| 5,048,117 A | 9/1991 | Aisaka et al. |
| 5,054,115 A | 10/1991 | Sawa et al. |
| 5,081,667 A | 1/1992 | Drori et al. |
| 5,095,480 A | 3/1992 | Fenner |
| 5,095,503 A | 3/1992 | Kowalski |
| 5,109,402 A | 4/1992 | Anderson et al. |
| 5,119,397 A | 6/1992 | Dahlin et al. |
| 5,127,041 A | 6/1992 | O'Sullivan |
| 5,146,486 A | 9/1992 | Lebowitz |
| 5,148,473 A | 9/1992 | Freeland et al. |
| 5,189,734 A | 2/1993 | Bailey et al. |
| 5,203,012 A | 4/1993 | Patsiokas et al. |
| 5,212,722 A | 5/1993 | Murata |
| 5,214,774 A | 5/1993 | Welsch et al. |
| 5,235,595 A | 8/1993 | O'Dowd |
| 5,237,570 A | 8/1993 | Smolinske et al. |
| 5,260,988 A | 11/1993 | Schellinger et al. |
| 5,274,837 A | 12/1993 | Childress et al. |
| 5,276,703 A | 1/1994 | Budin et al. |
| 5,276,908 A | 1/1994 | Koohgoli et al. |
| 5,287,541 A | 2/1994 | Davis et al. |
| 5,293,635 A | 3/1994 | Faulk, Jr. et al. |
| 5,297,142 A | 3/1994 | Paggeot et al. |
| 5,301,359 A | 4/1994 | Van den Heuvel et al. |
| 5,331,634 A | 7/1994 | Fischer |
| 5,331,635 A | 7/1994 | Ota |
| 5,333,177 A | 7/1994 | Braitberg et al. |
| 5,347,272 A | 9/1994 | Ota |
| 5,353,023 A | 10/1994 | Mitsugi |
| 5,371,734 A | 12/1994 | Fischer |
| 5,408,684 A | 4/1995 | Yunoki et al. |
| 5,428,636 A | 6/1995 | Meier |
| 5,442,553 A | 8/1995 | Parrillo |
| 5,442,633 A | 8/1995 | Perkins et al. |
| 5,445,347 A | 8/1995 | Ng |
| 5,446,736 A | 8/1995 | Gleeson et al. |
| 5,459,660 A | 10/1995 | Berra |
| 5,475,864 A | 12/1995 | Hamabe |
| 5,475,868 A | 12/1995 | Duque-Anton et al. |
| 5,479,479 A | 12/1995 | Braitberg et al. ............. 379/58 |
| 5,483,524 A | 1/1996 | Lev et al. |
| 5,491,690 A | 2/1996 | Alfonsi et al. |
| 5,506,888 A | 4/1996 | Hayes et al. |
| 5,509,123 A | 4/1996 | Dobbins et al. |
| 5,513,379 A | 4/1996 | Benveniste et al. |
| 5,515,043 A | 5/1996 | Berard et al. |
| 5,519,621 A | 5/1996 | Wortham |
| 5,519,884 A | 5/1996 | Duque-Anton et al. |
| 5,526,404 A | 6/1996 | Wiedeman et al. |
| 5,530,701 A | 6/1996 | Stillman et al. |
| 5,535,274 A | 7/1996 | Braitberg et al. |
| 5,544,222 A | 8/1996 | Robinson et al. |
| 5,551,066 A | 8/1996 | Stillman et al. |
| 5,561,836 A | 10/1996 | Sowles et al. |
| 5,566,173 A | 10/1996 | Steinbrecher |
| 5,594,718 A | 1/1997 | Weaver, Jr. et al. |
| 5,594,943 A | 1/1997 | Balachandran |
| 5,630,061 A | 5/1997 | Richter et al. |
| 5,636,371 A | 6/1997 | Yu |
| 5,646,939 A | 7/1997 | Lindeborg et al. |
| 5,649,308 A | 7/1997 | Andrews |
| 5,675,490 A | 10/1997 | Bachhuber |
| 5,710,908 A | 1/1998 | Man ........................ 395/500 |
| 5,732,074 A | 3/1998 | Spaur et al. ................ 370/312 |
| 5,752,193 A | 5/1998 | Scholefield et al. |
| 5,822,427 A | 10/1998 | Braitberg et al. |
| 5,826,188 A | 10/1998 | Tayloe et al. |
| 5,838,251 A | 11/1998 | Brinkmeyer et al. |
| 5,941,972 A | 8/1999 | Hoese et al. |
| 6,122,514 A | 9/2000 | Spaur et al. ................ 455/448 |
| 6,175,789 B1 * | 1/2001 | Beckert et al. .............. 701/33 |
| 6,202,008 B1 * | 3/2001 | Beckert et al. .............. 701/33 |
| 6,204,570 B1 | 3/2001 | Muller |
| 6,282,469 B1 * | 8/2001 | Rogers et al. ................ 701/29 |
| 6,301,658 B1 | 10/2001 | Koehler |
| 6,341,218 B1 | 1/2002 | Poplawsky et al. |
| 6,377,825 B1 | 4/2002 | Kennedy et al. ............ 455/569 |
| 6,421,753 B1 | 7/2002 | Hoese et al. |
| 6,425,035 B2 | 7/2002 | Hoese et al. |
| 6,425,036 B2 | 7/2002 | Hoese et al. |
| 6,427,101 B1 | 7/2002 | Diaz et al. |
| 6,430,164 B1 | 8/2002 | Jones et al. ................ 370/313 |
| 6,452,484 B1 | 9/2002 | Drori |
| 6,516,192 B1 | 2/2003 | Spaur et al. |
| 6,535,913 B2 | 3/2003 | Mittal et al. |
| 6,738,854 B2 | 5/2004 | Hoese et al. |
| 6,763,419 B2 | 7/2004 | Hoese et al. |
| 6,765,497 B2 | 7/2004 | Ablay et al. |
| 6,789,152 B2 | 9/2004 | Hoese et al. |
| 6,856,820 B1 | 2/2005 | Kolls |
| 6,868,333 B2 * | 3/2005 | Melen ........................ 701/200 |
| 6,873,824 B2 | 3/2005 | Flick |
| 6,895,310 B1 | 5/2005 | Kolls |
| 6,954,689 B2 | 10/2005 | Hanson et al. |
| 6,957,133 B1 * | 10/2005 | Hunt et al. ................... 701/29 |
| 6,960,990 B2 | 11/2005 | McKibbon |
| 7,003,289 B1 | 2/2006 | Kolls |
| 7,039,672 B2 | 5/2006 | Wu et al. |
| 7,051,147 B2 | 5/2006 | Hoese et al. |
| 7,142,844 B2 * | 11/2006 | Obradovich et al. ..... 455/414.1 |
| 7,197,637 B2 | 3/2007 | Schmidt et al. |
| 2002/0032853 A1 | 3/2002 | Preston et al. |
| 2002/0097193 A1 | 7/2002 | Powers |
| 2002/0116103 A1 * | 8/2002 | Matsunaga et al. ........... 701/29 |
| 2002/0133273 A1 * | 9/2002 | Lowrey et al. ............... 701/29 |
| 2002/0133716 A1 | 9/2002 | Harif |
| 2002/0138592 A1 | 9/2002 | Toft |
| 2002/0143447 A1 * | 10/2002 | Miller ........................ 701/35 |
| 2003/0005151 A1 | 1/2003 | Ullman et al. |
| 2003/0050752 A1 * | 3/2003 | Seto et al. ................... 701/208 |
| 2003/0065432 A1 * | 4/2003 | Shuman et al. ............... 701/48 |
| 2003/0158963 A1 * | 8/2003 | Sturdy et al. ............... 709/238 |
| 2003/0163588 A1 | 8/2003 | Boberg et al. |
| 2004/0185842 A1 | 9/2004 | Spaur et al. |
| 2004/0217852 A1 | 11/2004 | Kolls |
| 2004/0267410 A1 | 12/2004 | Duri et al. |
| 2005/0049765 A1 | 3/2005 | Chetia et al. |
| 2005/0065678 A1 * | 3/2005 | Smith et al. ................... 701/29 |
| 2005/0075768 A1 * | 4/2005 | Nicholson et al. ............ 701/29 |
| 2005/0083929 A1 | 4/2005 | Salo et al. |
| 2005/0102074 A1 | 5/2005 | Kolls |
| 2005/0131595 A1 * | 6/2005 | Luskin et al. ................ 701/29 |
| 2005/0171660 A1 * | 8/2005 | Woolford et al. ............. 701/33 |
| 2005/0197747 A1 * | 9/2005 | Rappaport et al. ............. 701/1 |
| 2005/0266879 A1 | 12/2005 | Spaur et al. |
| 2006/0235925 A1 | 10/2006 | Rossotto et al. |
| 2007/0051544 A1 * | 3/2007 | Fernandez ................. 180/65.8 |

FOREIGN PATENT DOCUMENTS

| | | |
|---|---|---|
| DE | 4220963 | 1/1993 |
| DE | 4300848 | 8/1993 |
| DE | 3789730 | 9/1994 |
| DE | 2051747 | 7/2001 |
| EP | 0242099 | 10/1987 |
| EP | 0249487 | 12/1987 |
| EP | 0292811 | 11/1988 |
| EP | 0300200 | 1/1989 |
| EP | 0392411 | 10/1990 |
| EP | 0494780 | 7/1992 |
| EP | 0501058 | 9/1992 |
| EP | 0509776 | 10/1992 |

| | | |
|---|---|---|
| EP | 0528090 | 2/1993 |
| EP | 0617361 | 9/1994 |
| EP | 0639930 | 2/1995 |
| EP | 0666699 | 8/1995 |
| EP | 0699361 | 3/1996 |
| EP | 0875111 | 11/1998 |
| FR | 2721776 | 12/1995 |
| GB | 2264613 | 9/1993 |
| GB | 2288892 | 11/1995 |
| GB | 2351588 | 9/2007 |
| JP | 60-011755 | 1/1985 |
| JP | 1-503271 | 11/1989 |
| JP | 2-72042 | 6/1990 |
| JP | 3-1621 | 1/1991 |
| JP | 3-196723 | 8/1991 |
| JP | 5-252106 | 9/1993 |
| JP | 07067174 | 3/1995 |
| JP | 7-177570 | 7/1995 |
| JP | 8-154273 | 6/1996 |
| WO | WO 89/03624 | 4/1989 |
| WO | WO 90/09645 | 8/1990 |
| WO | WO 91/02424 | 2/1991 |
| WO | WO 93/24911 | 12/1993 |
| WO | WO 95/07595 | 3/1995 |
| WO | WO 95/16330 | 6/1995 |
| WO | WO 95/17077 | 6/1995 |
| WO | WO 95/31060 | 11/1995 |
| WO | WO 95/33352 | 12/1995 |
| WO | WO 96/14719 | 5/1996 |
| WO | WO 96/28947 | 9/1996 |
| WO | WO 99/22301 | 5/1999 |

OTHER PUBLICATIONS

IXI Mobile, Inc.; IXI Personal Mobile Gateway Product Information; available at http://www.ixi.com; printed Apr. 29, 2004; 13 pages.

IXI Mobile, Inc.; Personal Mobile Gateway Brochure; "Connect with Style"; 2001; 11 pages.

Auslander, Edgar; IXI Mobile, Inc.; IXI Mobile Presentation; "Developing the Mobile handset; New Visions"; Feb. 19, 2002; 20 pages.

Fuchs, Axel; "Next Generation Portable Devices," Telematics Update, Dec. 2003-Jan. 2004, issue 25; pp. 11-13.

Kelly, S., "Mobile TV coming of age," BBC News, (Jul. 11, 2004), 3 pages available at http://news.bbc.co.uk/go/pr/fr/-/2/hi/technology/3880069.stm.

Pascoe, B., "Enabling News Markets for Hand Held and Palm-Size Information Applications," The Salutatioon Consortium, pp. 1-10 (1998).

Richard III, G., "Service Advertisement and Discovery: Enabling Universal Device Cooperation," IEEE Internet Computing, pp. 18-26 (2000).

van den Broecke, J., "Pushlets: Send events from servlets to DHTML client browsers," JavaWorld, 15 pages at http://www.javaworld.com/javaworld/jw-03-pushlet_p.html, (Mar. 2000).

van den Broeck, J., "Pushlets—Whitepaper," Just Objects B.V., 16 pages at http://www.pushlets.com/doc/whitepater-all.html, (2002).

Wildstrom, S.H., "Coming Soon: Mobile Couch Potatoes," Business Week, p. 22 (Mar. 28, 2005).

iPod on Wheels—likelihood: 60 percent and iPhone—Likelihood: 50 percent, Business 20, p. 76 (Apr. 2005).

Brew, Qualcomm, Manufacturer, 2 pages at http://brew.qualcomm.com/brew/en/manufacturer/oem.html (2003).

Brew, Qualcomm, About BREW®, 2 pages at http://brew.qualcomm.com/brew/en/about/about_brew.html (2002-2005).

"Building Networks on the Fly," IEEE Spectrum Online, 5 pages at http://www.spectrum.ieee.org/WEBONLY/publicfeature/mar01/net.html, (2001).

"Toshiba announces Ubiquitous Viewer software," Mobile Tracker, 1 page at http://www.mobiletracker.net/archives/2005/01/18toshiba-pc-control, (2003-2005).

MobileTracker, "Toshiba announces ublquitous viewer software," 1 page, (Jan. 18, 2005) available at http://www.mobiletracker.net/archives/2005/01/18/toshiba-pc-control, printed Jan. 20, 2005.

Pascoe, R., IEEE Spectrum Online, "Building Networks on the Fly" 5 pages, (Feb. 28, 2001) available at http:/www.spectrum.ieee.org/WEBONLY/publicfeature/mar01/net.html, printed Jan. 19, 2005.

Pascoe, R., The Salutation Consortium, "Geographic Computing: Enabling New Markets for Hand Held and Palm-Size Information Appliances: A Salutation White Paper," pp. 1-11, (Dec. 16, 1998).

Richard, III, G.G., IEEE Internet Computing, "Service Advertisement and Discovery: Enabling Universal Device Cooperation," pp. 18-26 (Sep.-Oct. 2000).

Examiner Hauser-Schmieg, Supplementary European Search Report for European Patent Application No. EP04706066, mailed Sep. 5, 2007, p. 1-4.

Whitfield, International Search Report for International (PCT) Patent Applicatin No. PCT/US05/14989, mailed Aug. 24, 2007, p. 1-5.

Whitfield, Written Opinion for International (PCT) Patent Application No. PCT/US05/14989, mailed Aug. 24, 2007, p. 1-5.

Exminer Peeso, Official Action for U.S Appl. No. 10/767,548, mailed Jul. 6, 2007, p. 1-6.

U.S. Appl. No. 08/957,652, Bentley, Oct. 24, 1997.

"AMI Consortium Formed to Define Common Vehicle Access Standards" NEWS From The Automotive Multimedia Interface Consortium, Dearborn, MI, Oct. 19, 1998, 2 pages.

"CellPort MSC-9710 MobileWeb Developer's Kit" CellPort Labs, Inc., Copyright 1997, 12 pages.

"FUSION Web Server" PacificSoftworksInc., date unknown, 4 pages.

"Motorola Unveils iRADIOtm at CES 2000; Wireless Web Access Coming Soon To A Car Near You", NEWS, Las Vegas, NV, Jan. 6, 2000, 2 pages.

"Powerful New Carmaker Consorium To Create Standard Multimedia Interfaces" The Hansen Report on Automotive Electronics, vol. 11, No. 8, Oct. 1998, pp. 1-8.

"Telematics Suppliers Consortium Formed to Define Telematics Standards", Telematics Suppliers Consortium, Detroit, MI, Oct. 19, 1998, 2 pages.

"Windows History Internet Explorer History", available at http://www.microsoft.com/windows/WinHistoryIE.mspx, published Jun. 30, 2003, 1 page.

"Wireless Road by Vetronix" Vertronix Corporation, date unknown, 4 pages.

AB3X Cellular Interface Owner's Manual, Morrison & Dempsey Communications, Nov. 16, 1987.

Amsel: Lange Leitungen—Intelligentes Gateway fur WANs [Long lines—Intelligent gateway for WANs] in : C't Magazin fur Computertechnik, Heise-Verlag, 1992, Issue 07, pp. 86 ff.

Bilgic "A PCS terminal architecture to access multiple networks" Vehicular Technology Conference, 1996. Mobile Technology For The Human Race., IEEE 46th Atlanta, GA, USA, Apr. 28-May 1, 1996, pp. 1160-1164, XP010162572, ISBN: 0-7803-3157-5.

Brauer: Fernbedienug [Remote Control]—Remotely Possible/Sockets 1.0 in: C'T Magazin fur Computertechnik, Heise-Verlag, 1995, No. 4, pp. 80 ff.

Clark, "Connected Cars", Extra!A Supplement to Wireless Review, date unknown, 1 page.

Cohen et al. "IP addressing and routing in a local wireless network" One World Through Comminications. Florence, May 4-8, 1992, Proceedings of the conference on Computer Communications (INFOCOM), New York, IEEE, US, vol. 2, Conf. 11, May 4, 1992, pp. 626-632m XP010062192, ISBN: 0-7803-0602-3.

Comer "Internat Protocol: Error And Control Messages (ICMP)" Internetworking with TCP/IP vol. I, Pricipples, Protocols, and Architecture, Prentice-Hall, Inc., Copyright 1995, ISBN 0-13-216987-8, p. 123, 269, cover and inside cover.

Coviello et al., "Conceptual Approaches to Switching in Future Military Networks", pp. 1491-1498, IEEE Transactions on Communications, vol. Com-28, No. 9, Sep. 1980.

Furkukawa et al. "A self-organized reuse-partitioning dynamic channel assignment scheme with quality based power control" Personal, Indoor and Mobile Radio Communications, 1995.

PIMRC'95. Wireless: Merging onto The Information Superhighway., Sixth IEEE International Symposium on Toronto, Ont., Canada Sep. 27-29, 1995, pp. 562-566, XP01050949, ISBN: 0-7803-3002-1.

Hansen, "Online Onboard: Personal Computing, Speech and The Internet In the Vehicle", Copyright 1998 by Paul Hansen Associates, Rye, New Hampshire, pp. 1-62.

Hosenfeld et al., Kommunikation ohne Grenzen—TCP/IP Informationsubermittlung im Internet [Communication without boundaries—TCP/IP Information transmission in the Internet] in: C't Magazin fur Computertechnik, Heise-Verlag, 1995, Issue 12, pp. 330 ff.

Kane, "The HP-IL System" McGraw hill, 1982, p. 22 and 38.

Katzela et al., "Channel Assignment Schemes for Cellular Mobile Telecommunication Systems: A Comprehensive Survey" IEEE Personal Communications, IEEE Communications Society, US, vol. 3, No. 3, Jun. 1, 1996, pp. 10-31, XP000593925, ISSN: 1070-9916.

Kunze: Geheimtip—Entwickeln und Testen von Web-Projekten [Insider's tip- Developing and testing web projects] in: C't Magazin fur Computertechnik, Heise-Verlag, 1995, Issue 07, pp. 166 ff.;.

Leibson "The Handbook of Microcomputer Interfacing" Tab Books, Inc., 1983, p. 135 and 141.

Margolin "Smarter Stuff" Byte, Jun. 1997, 5 pages.

Napolitano et al. "UMTS all-IP Mobility Management, Call and session control Procedure"; Mar. 24, 2000; XP002149519.

Perkins, "mobile IP" IEEE Communications Magazine, May 1997, 12 pages.

Stuckenberg: Labyrinth—Routing-Verfahren in Wide-Area Networks, [Routing methods in wide area networks] in: C't Magazin fur Computertechnik, Heise-Verlag, 1994, No. 11, p. 238 ff.

Swasey "Padcom Intros Data Technology Laptop Users Can Receive Data Over Different Networks", date unknown, 1 page.

Varrall, "The Impact Of The Internet On Wireless Networks", Shosteck Cellular//PCS Strategies newsletter, date unknown, 3 pages.

Wright et al., TCP/IP Illustrated vol. 2: The Implementation, Addison-Wesley Professional Computing Series, Mar. 1996, pp. 63-74.

"Can femotcells boost WiMAX?" available at http://www.wimax-vision.com/newt/1/wimaxvision/viewarticle.htm?artid=20017426414, printed May 29, 2007, 2 pages.

"History of Communications—INTERNET: Common Standards" available at http://www.fcc.gov/omd/history/internet/common-standards.html, printed Jul. 31, 2006, 1 page.

"History of the Future", available at http://www.isoc.org/internet/history/brief.shtml, printed Jul. 20, 2006, 1 page.

"Phoneo" available at http://www/superiorcommunications.com/products/Phoneo.aspx, Superior Communications, printed May 10, 2007, 1 page.

"Product review. Networkcar" Telematics Update, Issue 28, Jun.-Jul. 2004, pp. 14-15.

"Sprint Goes Femto With WiMax" available at http://www.unstrung.com/document.asp?doc_id=122376&print=true, Dan Jones, Site Editor for Unstrung, Light Reading Inc., Apr. 23, 2007, 1 page.

"Sprint to Launch Samsung Femtocell", available at http://www.phonescoop.com/news/item.php?n=2146, Source: Samsung, Posted Mar. 28, 2007, 2 pages.

"Startup's dual-radio IC opens door to roaming", Electronic Engineering EETimes, Issue 1323, May 31, 2004, 3 pages.

Motsay, "Telematics could get boost from 802.11p development" RCR Wireless News, Aug. 9, 2004, 1 page.

Talbot "Soul of a New Mobile Machine" Technology Review, May/Jun. 2007, p. 46-53 and cover.

Zeman, "Ubi, I Be, We Be Screaming For Samsung's UbiCell Femtocell", available at http://www.informationweek.com/blog/main/archives/2007/03/ubi_ibe_webe_sc.html;jses . . . , Mar. 30, 2007, 2 pages.

International Search Report of International (PCT) Patent Application No. PCT/US04/02441, mailed May 31, 2005(2856-51-PCT).

Written Opinion of International (PCT) Patent Application No. PCT/US04/02441, mailed May 31, 2005 (2856-51-PCT).

International Preliminary Report on Patentability of International (PCT) Patent Application No. PCT/US04/02441, issued Jul. 29, 2005 (2856-51-PCT).

Official Action for U.S. Appl. No. 11/119,266, mailed Oct. 5, 2006.

Notice Of Allowance for U.S. Appl. No. 11/119,266, mailed Apr. 10, 2007.

Examiner Contee, Official Action for U.S. Appl. No. 11/119,266, mailed Sep. 26, 2007, p. 1-8.

* cited by examiner

| Field Name | Data Type | Field Description |
|---|---|---|
| Name | String | Name of Managed Application |
| SvcExec | String | Executable image to be invoked |
| StartTime | Word | 1:Start on boot<br>2:Start on demand |
| ExecID | Word | Unique ID for the executable image |
| SvcClass | Word | Service class |
| SvcType | Word | Service Type |
| SvcAncillary | String | Additional service description information. May include version info, etc. |
| MaxRefs | Word | Maximum number of simultaneous connections to the service. |
| RemAccess | Bool | True: remote access permitted;<br>False: not permitted |
| StatusFreq | Word | CPCF status monitoring frequency - in seconds |
| StatusTimeout | Word | Maximum time allowed to respond to status request |
| RestartPolicy | Word | 1: terminate on status response timeout<br>2: Restart application on status response timeout |
| Privileges | TBD | Specifies the privileges required for a Client to connect to the service. |
| | | |

*Fig. 17A*

| | | Dynamic Service Table |
|---|---|---|
| SvcID | Word | Service ID |
| RefCount | Word | Current number of connections to the service |
| ControlChannel | Word | Reference to the control channel through which the CPCF communicates with the Service Engine providing this service. |
| SvcState | Word | 1: Not invoked (an invoke on demand service)<br>2: Invoked (no services registered)<br>3: Running (service posted by service engine)<br>4: Service not responding |

*Fig. 17B*

| Field Name | Data Type | Field Description |
|---|---|---|
| SvcEngine | String | Name of the service engine |
| SvcExec | String | Reference to executable file of service engine |
| StartTime | Word | 1:Start on boot<br>2:Start on demand (on service request) |
| StatusFreq | Word | CPCF status monitoring frequency - in seconds |
| SvcClass | Word | Service class |
| SvcType | Word | Service Type |
|  |  |  |
| StatResponse | Word | Maximum allowed time to respond to status request. |
| RestartPolicy | Word | 0: terminate on status response timeout<br>1: Restart on status response timeout<br>2: |
|  |  |  |

*Fig. 18*

ENABLING INTEROPERABILITY BETWEEN DISTRIBUTED DEVICES USING DIFFERENT COMMUNICATION LINK TECHNOLOGIES

FIELD OF THE INVENTION

The present invention is directed to providing interoperability between or among devices and functions. In particular, embodiments of the present invention enable distributed devices and applications to interoperate even though such devices and applications are implemented on different platforms and use different communication link technologies.

BACKGROUND OF THE INVENTION

As devices have become increasingly capable, the desirability of exchanging information between devices has increased. However, different devices often use different, incompatible communication link technologies. Accordingly, allowing devices to exchange information has been difficult.

The desirability of allowing communications between different devices that are not formally associated with one another, for example by being interconnected to the same network, has also increased as devices have become more portable. In particular, because any number of different devices can be associated with a user or a work space, it would be desirable to allow different devices to exchange information or share resources. For example, it would be desirable to allow a global positioning system (GPS) receiver associated with the user to provide location information to a personal digital assistant (PDA) associated with that user and running a mapping application to exchange information. Furthermore, it would be desirable to allow such a PDA to initiate automatic dialing of numbers held in a directory stored on the PDA by a wireless telephone also associated with the user. As yet another example, it would be desirable to allow such devices to communicate with a vehicle data bus, such as a controller area network (CAN) and to exchange information with one another, when located in or associated with a user's vehicle.

Although systems integrating the functions of various types of devices have recently been made available, such arrangements are not truly flexible. For example, devices integrating PDAs and telephones, or PDAs and GPS receivers, are now available. However, such devices tend to be cumbersome to use and expensive. In addition, the ability of such devices to communicate with additional devices has been limited or nonexistent. As still another example, vehicle manufacturers have offered cellular telephones that are capable of being interconnected to audio, visual display, and data entry functions provided by automobiles. However, such systems have been difficult or impossible to upgrade when new technology, for example new cellular communication technology, has become available. Such systems have also been incapable of allowing various functions otherwise available on the vehicle to be integrated with one another, thereby limiting the potential for information sharing, and have typically had no ability to interconnect a vehicle to devices other than a specific model of cellular telephone. Furthermore, such systems have been expensive.

In many cases, the difficulty with allowing different devices to share information has been the fact that different devices often use incompatible firmware or operating systems. Furthermore, different devices often use different communication link technologies. Accordingly, in order to allow devices to communicate with one another, it has been necessary for developers to specifically plan ahead, and provide extensive specialized code, in order to allow for such interoperability. In particular, developers have been required to anticipate and to provide programming to support interoperability between known devices as part of their development. Accordingly, devices have not been capable of interoperating with other devices unless prior knowledge of the exact operating parameters of such other devices was available. Also, devices intended for communication with one another would need to be provided with compatible communication link technology.

Attempts at overcoming some of these limitations have been made. For example, computer networks have been used to exchange information between different devices. However, such arrangements have required individual devices to provide all of the layers required for communications over that network, either through integration with the device itself or through the use of a specialized adaptor for that device. In addition, in order for different devices to share information, the higher level protocols of at least one of the devices must conform to those of the other device. Accordingly, even when devices have been designed to be compatible with a communication link comprising an existing network, they must still adapt to the requirements of one or more other devices if information is to be exchanged or resources shared. For example, attempts have been made to expand the types of devices in a vehicle that can be interconnected using a standardized communications protocol. However, such systems do not solve the problem of requiring each interconnected device to be specially adapted to the standardized protocol, the standardized protocol must include messages required by all the interconnected devices, and the interconnected devices must support the communications link technologies used by the system. Therefore, such systems have remained inflexible and expensive to implement, and have required prior knowledge of the devices that can be joined to the system and the capabilities of those devices.

SUMMARY OF THE INVENTION

The present invention is directed to solving these and other problems and disadvantages of the prior art. According to embodiments of the present invention, an apparatus for enabling interoperability between and/or among different devices is provided. According to such an apparatus, a central communications interface system (CIS) has a connection framework process that allows different devices and applications to advertise their own services and search for the services of other devices or applications. In addition, the connection framework process functions as a facility or mechanism by which devices or applications can subscribe to and receive requested events from other devices or applications.

Embodiments of the apparatus also provide interfaces to allow different devices using a number of different communications link technologies or communications channels to operably interconnect with the interface system. Such interfaces may include both the physical hardware (i.e., layer 1 of the standard network communication stack model), and software tools or modules that provide the functions of the link layer (layer 2), the network layer (layer 3) and the transport layer (layer 4), as required by the particular communication link technologies that are supported or enabled. The communication resources provided by the communications interface system can be used by applications to access or obtain information from different services, other applications or devices without a priori knowledge of the existence of the services, other applications or devices available in connection with a particular instance of a system or of the communication link interconnecting devices to the system. As a result, applications or services that wish to share information or processes with other applications or to access information and processes available from other applications or services, whether or not such applications are running on the same or different platforms or devices, need only conform higher level communications to messages that can be understood by the communications interface system. In particular, apart from using messages required by the communications interface system in order to perform functions such as advertising services and subscribing to events, embodiments of the communications interface system disclosed herein can handle, if necessary, the translation of specialized messages required by a service or application, or required in order to utilize specialized features of the service or application. Alternatively or in addition, embodiments of the communications interface system may provide a handle allowing applications to access raw data provided by services.

In order to provide support for different devices, services and applications, a communications interface system in accordance with embodiments of the present invention may provide various service engine components. The use of service engines allows the communications interface system to present one or more standard interfaces for devices interconnected to the system through the service engine. Such service engines enable industry or domain standard data formats to be utilized by interconnected devices. Accordingly, modifications to interconnected devices are not required in order to allow communication with the interface system. Furthermore, service engines that comprise adaptor software for devices that do not conform to standard data formats can be provided for nonstandard devices. By providing service engines or interfaces normalized to the particular interconnected devices, the interfaces appear as streaming data interfaces. Furthermore, by supporting service or application level messages required by a service or application through service engines, any information or resource available through a service or application can be provided to any other service or application even if the separate services or applications would be completely unable to communicate with one another in the absence of the communication interface system.

In accordance with further embodiments of the present invention, a communications interface system may be interfaced to a device that provides a second communications framework process. Accordingly, multiple devices, each running a communication framework process in accordance with embodiments of the present invention, may operate as interconnected hubs.

BRIEF DESCRIPTION OF THE DRAWINGS

FIG. 17A illustrates the contents of a static services table record in accordance with embodiments of the present invention;

FIG. 17B illustrates the contents of a dynamic services table record in accordance with embodiments of the present invention;

FIG. 18 illustrates the contents of a services initiation table record in accordance with embodiments of the present invention;

DETAILED DESCRIPTION

Figure 1A:
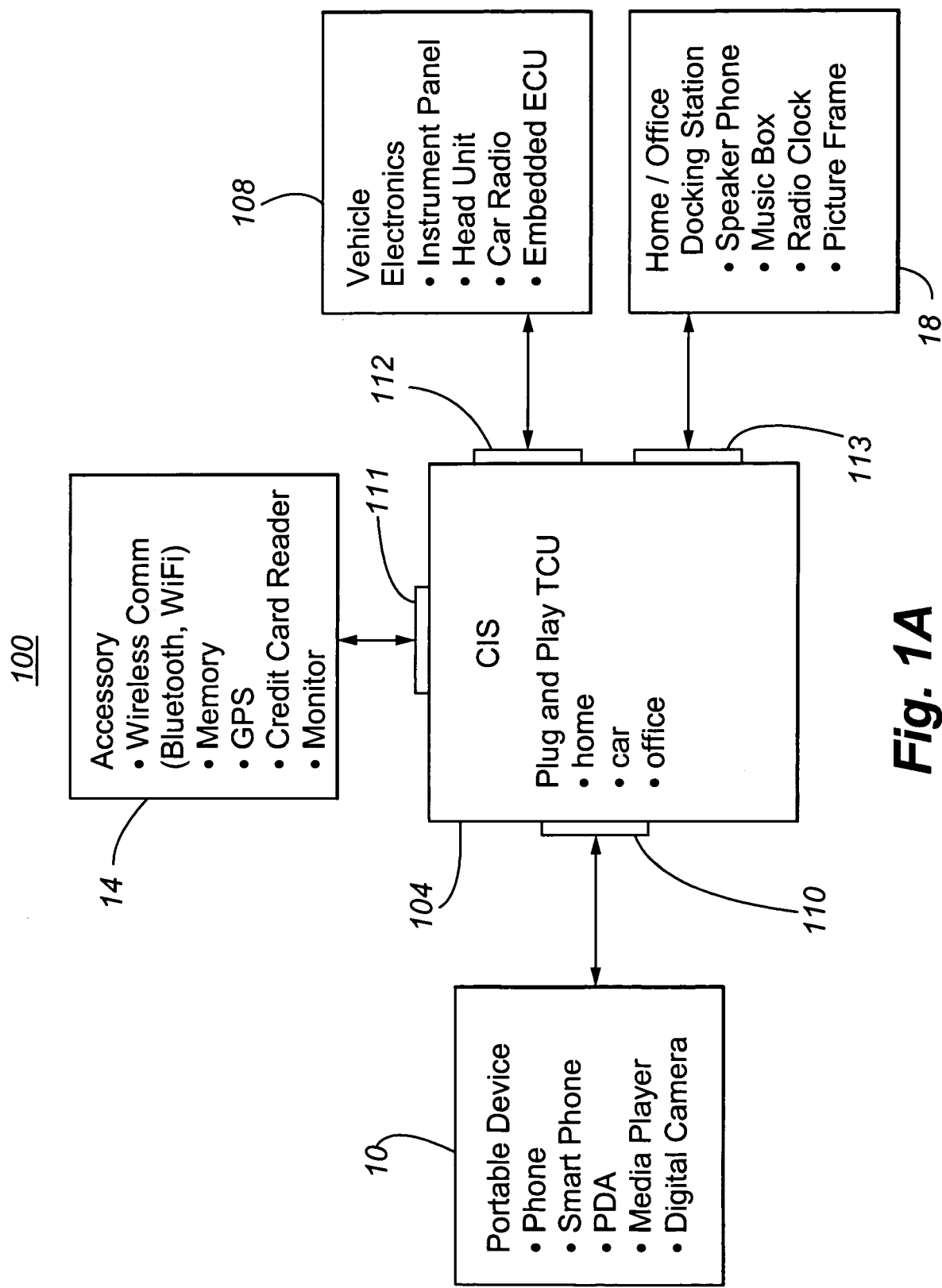
FIG. 1A is a block diagram of components of a system in accordance with embodiments of the present invention.

FIG. 1A is a block diagram depicting components of a communication system 100 in accordance with embodiments of the present invention. In general, the communication system 100 includes a plug and play telematics control unit or communications interface system (CIS) 104 that may be used in and/or specially configured for home, automobile, office, or other environments. As shown in FIG. 1A, the CIS 104 may be interconnected to a portable device 10 such as a telephone, smart telephone, cellular telephone, personal digital assistant, media player, digital camera, or other portable device. The CIS 104 may additionally be interconnected to one or more accessories 14. Examples of accessories include wireless communication devices, including Bluetooth or WiFi interfaces, memory, global positioning system (GPS) devices, magnetic card readers, monitors, or other accessory devices. Where an accessory 14 is an interface, it may function as a modular portable device port or other type of port 110. Embodiments of a CIS 104 may also be interconnected to vehicle electronics 108. For instance, a CIS 104 may be interconnected to the instrument panel, head unit, car radio, an embedded electronic control unit, or other vehicle electronics, to permit access to or control of information and applications associated with a vehicle 108. Embodiments of a CIS 104 may themselves be portable. Accordingly, a CIS 104 may be interconnected to a docking station 18. A docking station 18 may be located, for example, in a user's home and/or office, and may itself comprise a speaker phone, music box, radio clock, picture frame, or other device. Accordingly, it can be appreciated that a CIS 104 may be operably interconnected to a wide variety of electronic devices. Furthermore, such interconnections may be used to share or obtain information between applications running on or associated with the CIS 104 or various interconnected components, such as devices 10, accessories 14, docking stations 18, or vehicle electronics 104. In addition, one or more of the various portable devices 10, accessories 14, vehicle electronics 108 or docking station 18 interconnected to a CIS 104 may comprise a remote platform.

With respect to the various components interconnected to a CIS 104, different ports may be provided. For instance, a portable device port 110 may be used to interconnect the CIS 104 to one or more portable devices 10. Examples of communication link technologies used in connection with a portable device port 110 include universal serial bus (USB); simple serial port (e.g., RS-232/RS-422); IEEE 1394; analog or digital audio; Bluetooth; IEEE 802.11, including local area network, wide area network and/or broadband versions, including WiFi, WiMax and WiMobile (IEEE 802.11); ultra-wide band (UWB); compact flash slot, secure digital slot or other memory card slot; Ethernet; or other communication link technologies. An accessory port 111 may be provided for interconnecting accessories, to a CIS 104. Communication link technologies suitable for use in connection with an accessory port 111 include USB; simple serial port; IEEE 1394; analog or digital audio; UWB; compact flash slot, secure digital slot or other memory card slot; Bluetooth; IEEE 802.11; Ethernet or other communication link technologies. A vehicle interface port 112 for interconnecting to electronics associated with a vehicle 108 may include a Media Oriented Systems Transport (MOST) system, controller area network (CAN), IDB-M (1394) or other interface. A docking station port 113 may use USB; simple serial port IEEE 1394; Ethernet, analog or digital audio; Bluetooth; IEEE 802.11; UWB; or other communication link technology. As can be appreciated by one of skill in the art from the description provided herein, the particular ports 110-113 provided by a CIS 104 may be selected in view of the intended use or feature levels of the CIS 104. Furthermore, multiple instances of a port 110-113 may be provided. In addition, a single port 110-113 may comprise multiple port types, and support multiple interconnected devices, accessories, or other components 10-18 or 108. For instance, a single USB port may be interconnected to various components, such as one or more portable devices 10, one or more accessories 14, or one or more docking stations 18.

Figure 1B:
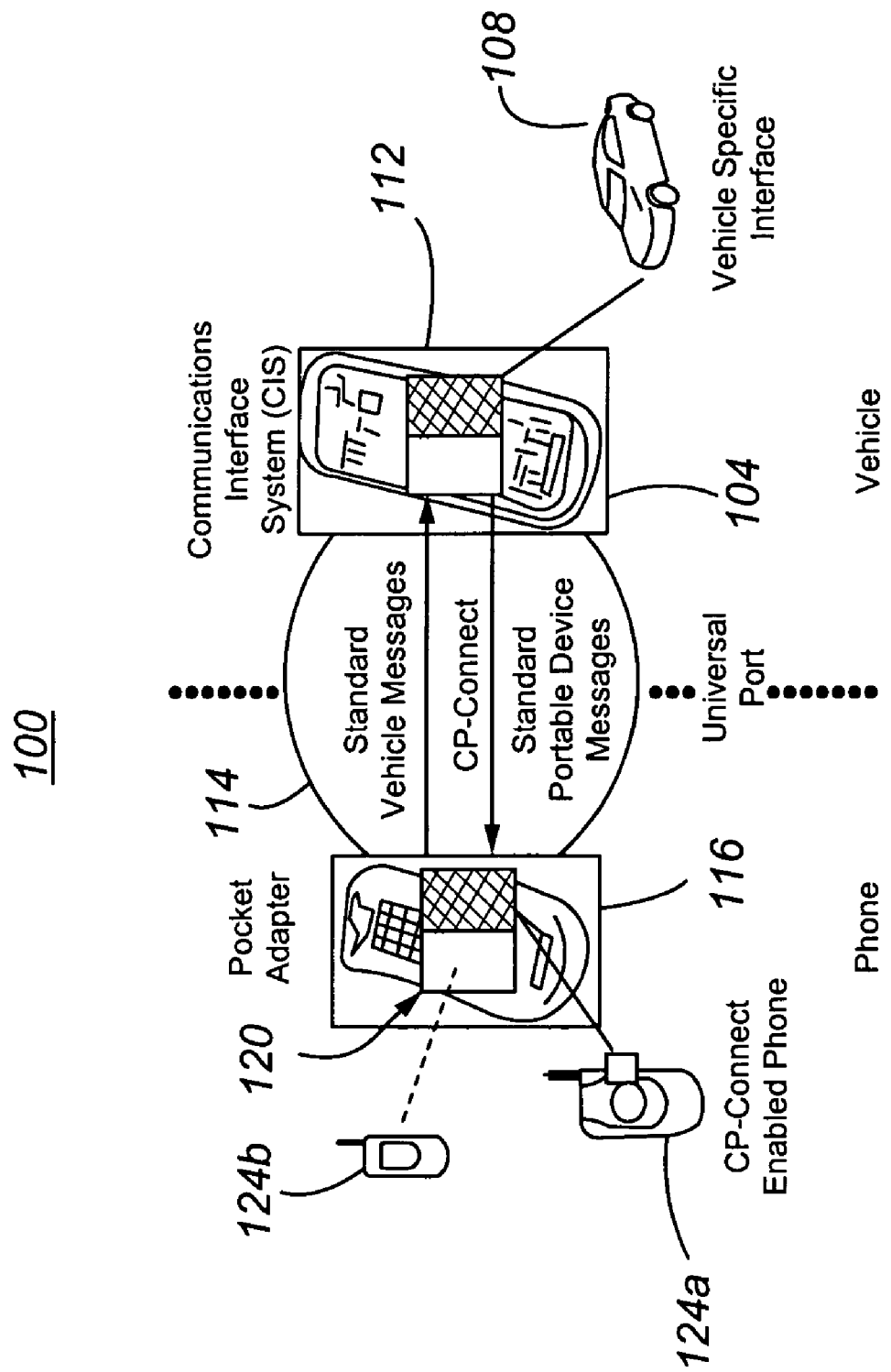
FIG. 1B is a schematic depiction of components in accordance with embodiments of the present invention.

FIG. 1B illustrates an exemplary context for a communication system or apparatus 100 in accordance with embodiments of the present invention. In the example communication system 100 shown in FIG. 1B, the communications interface system (CIS) 104 is interconnected to vehicle electronics 108 through a wire line vehicle specific interface or vehicle interface port 112. In general, the communications interface system 104 is a platform that provides a communication environment 114 featuring a communication framework process, as will be described in greater detail elsewhere herein. The communications interface system 104 illustrated in FIG. 1B provides a portable device port 110 (See FIG. 1A) comprising a universal port that allows a mechanical adaptor or pocket adaptor 116 to be interconnected to the communications interface system 104. The pocket adaptor 116 may receive a remote platform 120, such as a portable device 10 comprising a cellular telephone 124a running the communication framework process also provided by the communications interface system 104. Alternatively, the pocket adaptor 116 may receive a portable device 10 comprising a non-communication framework process enabled cellular telephone 124b, in which case a communication framework process may be provided by the pocket adaptor 116 (its product adaption may comprise a remote platform 120). As yet another alternative, a portable device 10 comprising a non-communication framework process enabled telephone 124b may communicate with the communications interface system 104 through a service engine, as will be described elsewhere herein.

The example communication system 100 illustrated in FIG. 1B allows standard vehicle messages to be passed from the communications interface system 104 to the vehicle 108, and enables the telephone 124 to access services, information or resources (hereinafter services) available through the vehicle electronics 108. The arrangement 100 also allows standard messages to be passed to the telephone 124. However, such communication links to the vehicle using the CIS 104 are not limited to a telephone 124 supported by a holder or cradle. Accordingly, the system 100 in accordance with embodiments of the present invention allows portable or embedded devices 10, 14 to be interfaced with a vehicle 108, without requiring either the vehicle electronics 108 or the device 10, 14 to directly interface with the other interconnected device.

In particular, the provision of a connection framework process allows devices interconnected to the communications interface system and/or applications running on the communications interface system 104 to advertise services. These communications interface system resident services can be utilized by other applications running on or interconnected to the communications interface system 104, a platform 120 that is remote or separate from the CIS 104 (such as the telephone 124), a vehicle 108, or on or interconnected to any other platforms supporting the connection framework process sharing protocols. In a similar manner, services running on or available through a remote computing platform 120, such as a telephone 124a, can advertise services to be utilized by communications interface system 104 resident applications or applications resident on other platforms. Accordingly, by providing a facility by which communications between applications and/or services are standardized, including distributed applications, such as the telematics applications in the example illustrated in FIG. 1B, embodiments of the present invention allow a network effect between devices and applications to be created, adding value to the individual devices and applications.

Services can relate to or be provided using any source of information associated with a device or any resource, including applications. Examples of services include power/charging, stereo audio capability, global positioning system (GPS) device data, onboard vehicle diagnostics data (such as OBD-II), a text-to-speech (TTS) engine, a speech recognition engine, a speech-based user interface facility, cellular telephones (embedded, portable and/or plug and play) or other communication device, and personal digital assistants (PDAs).

Figure 2:
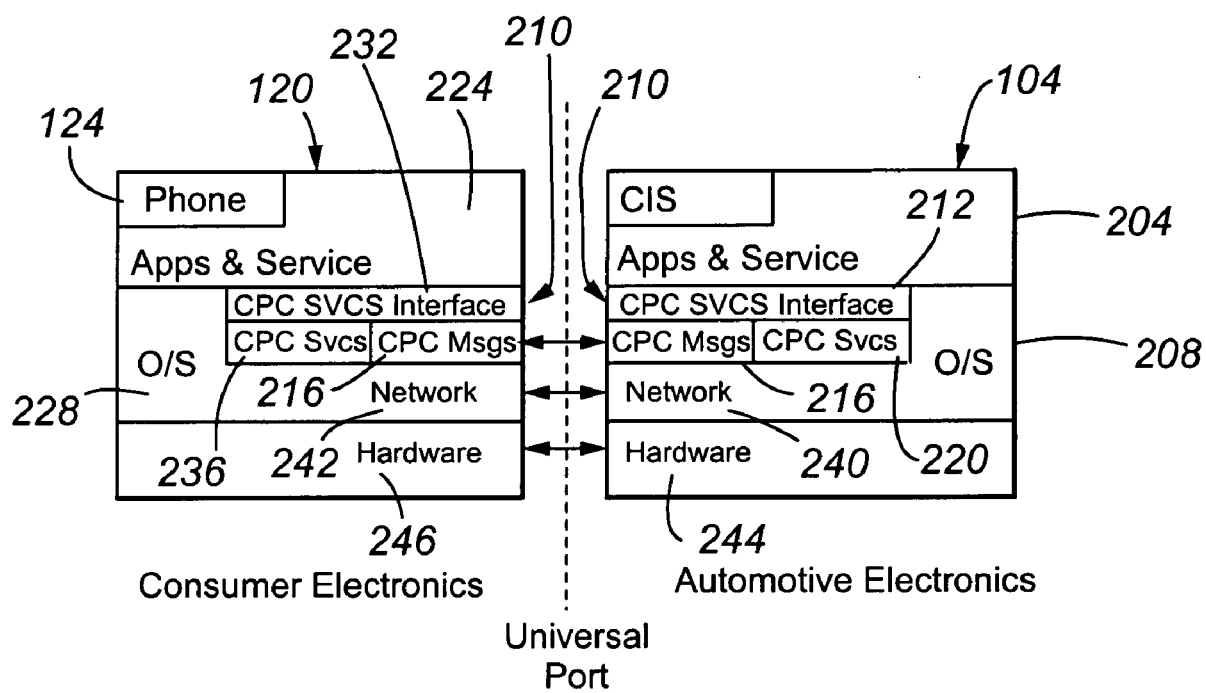
FIG. 2 is a block diagram depicting levels of communication between a communications interface system and an interconnected remote platform in accordance with embodiments of the present invention.

With reference now to FIG. 2, the relationship between software and hardware elements of components included in a communication arrangement such as the communication system 100 of FIG. 1A or 1B, are illustrated. As seen in FIG. 2, applications and services 204 may run on the communications interface system 104. In particular, applications and services 204 interact directly with the operating system 208 and with an application and services interface 212 function of a connection framework process 210. The application and services interface 212 utilizes communications interface system messages (or control messages) 216 and provides access to connection interface system services 220, also provided by the connection framework process 210. In accordance with embodiments of the present invention, the connection framework process 210 supports various protocols, such as Internet Protocol (IP), transmission control protocol (TCP), universal datagram protocol (UDP) and other protocol(s) for use with any universal plug and play device(s). In addition, embodiments of the present invention may include an operating system 208 that supports multi-threading and/or multi-tasking, and that includes protection mechanisms to prevent applications from corrupting system resources. The operating system 208 may also provide portable operating system interface (POSIX) compliant mechanisms for inter-process communications (IPC).

In the example arrangement illustrated in FIG. 2, the remote platform 120 is a connection framework process 210 enabled telephone 124. As shown in FIG. 2, applications and services 224 provided as part of or associated with the remote platform 120 interact directly with the remote platform's operating system 228 and have direct access to an application and services interface 232 of the connection framework process 210. The application and services interface 232 of the remote platform 120 utilizes communications interface system messages 216 and makes available connection interface system services 236. As can be appreciated by one of skill in the art from the description provided herein, the connection framework process 210 and the associated functions 232, 236 running on the remote platform 120 (i.e., the telephone 124), need not be identical to those running on the communications interface system 104. In connection with embodiments of the present invention, the operating system 228 on the remote platform 120 may provide the same or similar capabilities as the operating system 208 running on the communications interface system 104.

As depicted in FIG. 2, the communications interface system messages 216 used by the communications interface system 104 and the connection framework process enabled remote platform 120 may be identical. That is, a set of messages may be defined. As will be described in greater detail elsewhere herein, using communications interface system messages 216, devices and applications can advertise and subscribe to services. In addition to providing a mechanism for identifying and accessing specific services, the connection interface functions provided by the application and services interfaces 212, 232, the connection interface system services 220, 236, and the communications interface system messages 216 control the network 240, 242 and hardware or physical 244, 246 layers, allowing applications and services 204, 224 to communicate with one another using communications interface system messages 216 and/or using other higher level protocols. For instance, according to embodiments of the present invention, layers 1-4 of the network communication stack model are attended to by the functions and services provided by the communications interface system connection framework process 210 and by the connection framework process 210 (if any) of remote devices 120 (e.g., telephone 124) connected to the communications interface system 104. As described in greater detail elsewhere herein, control of the network and physical layers of communications links between platforms may be accomplished using communications interfaces incorporating interface engines.

As depicted in FIG. 2, the communications interface system 104 may be part of or interconnected to automotive electronics. Accordingly, embodiments of the present invention may be deployed as a part of systems 100 installed in vehicles. Furthermore, the remote platform 120, as depicted in FIG. 2, may comprise consumer electronics, including devices 10 or accessories 14 that are not themselves designed or specially adapted for use with a specific vehicle. As will be described in greater detail elsewhere herein, the communications interface system 104 may be interconnected to devices and/or applications, either through wire line or wireless connections, in addition or as an alternative to being interconnected to the electronic systems of a vehicle. Furthermore, if a remote platform 120 providing a communication framework process, such as the telephone 124 in FIG. 2, is included, devices and applications may be interconnected to the remote platform 120. Accordingly, a communications interface system 104 and an interconnected remote platform 120 (such as a telephone 124) may function as interconnected communication hubs.

Figure 3:
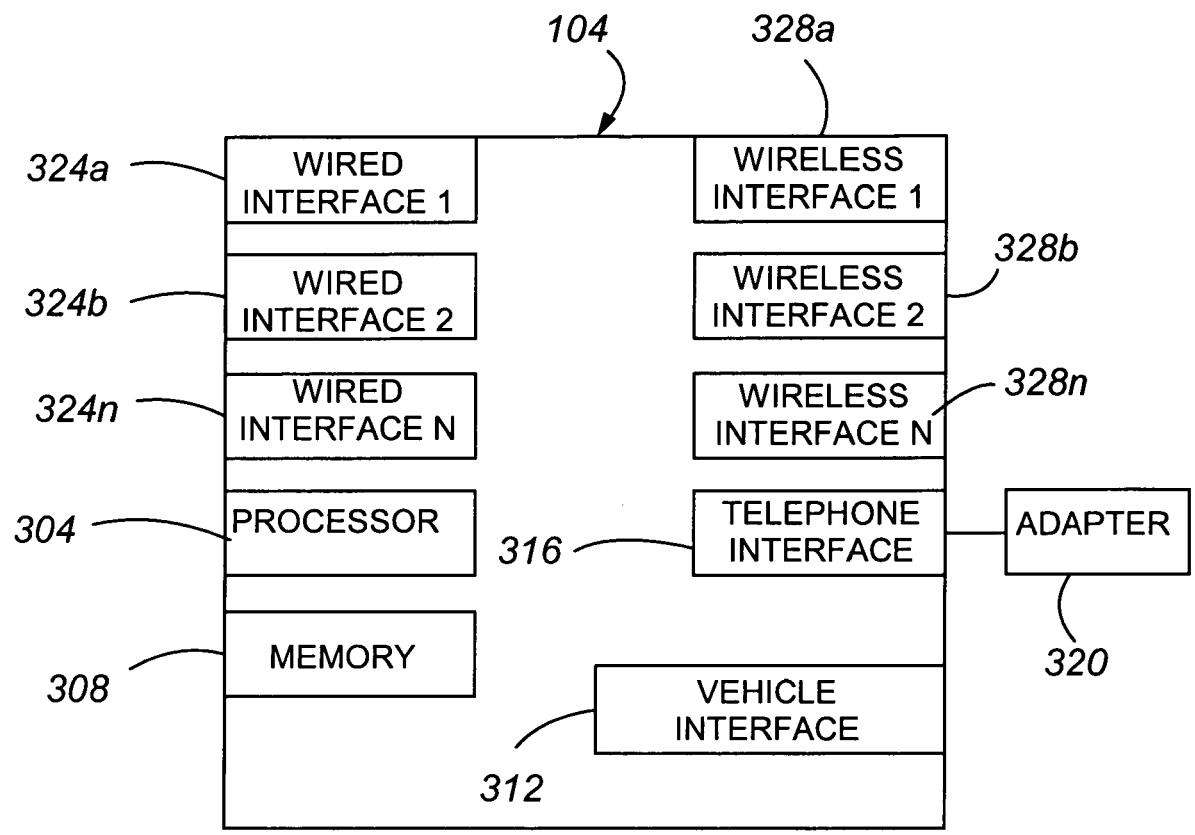
FIG. 3 is a block diagram depicting hardware components that may be included in a communications interface system in accordance with embodiments of the present invention.

With reference now to FIG. 3, various hardware components that may be included as part of a communications interface system 104 in accordance with embodiments of the present invention are depicted. In general, a communications interface system 104 may include a processor 304 capable of running operating system software 208 and application software, including applications and associated services 204. In addition, the processor 304 executes instructions in connection with the operation of an installed connection framework process 210, including the communication services interface 212, communication interface system services 220, and communications interface system message 216 functions. In accordance with embodiments of the present invention, the processor 304 may include a general purpose programmable processor or controller.

Memory 308 may be provided for storing operating system 208, application 204, communications framework process 210 and communication services and messages programming 212-220, and for storing data associated with the operation of such applications and programs. The memory 308 may comprise various storage devices alone or in combination. For example, the memory 308 may comprise solid state memory, such as DRAM or SDRAM, magnetic storage devices, or optical storage devices. In addition, the memory 308 may be integral to the processor 304, in whole or in part. For example, in accordance with embodiments of the present invention, the processor 304 and memory 308 may be implemented as an integrated controller, with operating system 208, application 204, communications framework process 210 and communication services and messages 212-220 programming stored as firmware. In connection with embodiments of the present invention, including embodiments having programming maintained as firmware, it is advantageous to provide flash memory or other reconfigurable memory devices 308, to allow for the expansion of supported services and devices, and to facilitate software upgrades and patches.

The communications interface system 104 additionally includes a number of interfaces. For example, in connection with embodiments in which the communication interface system 104 is installed in a vehicle, a vehicle interface 312 may be provided. The vehicle interface 312 provides a physical connection to onboard vehicle systems, such as to an onboard network. In addition, the vehicle interface 312 provides the necessary formatting of instructions received from or delivered to the vehicle. As an example, the vehicle interface 312 may comprise a controller area network (CAN) interface. In an exemplary embodiment of the present invention, the vehicle interface 312 may be provided as a daughter board. In accordance with other embodiments, the vehicle interface 312 is integral to or included in the communications interface system 104.

The communications interface system 104 may also include a telephone interface 316. An adaptor 320 may be associated with the telephone interface 316, to provide the necessary physical connection to an interconnected telephone (e.g., telephone 124). Accordingly, the adaptor 320 may comprise a cord for providing electrical interconnections between the communication interface system 104 and the telephone 124 and/or a pocket type adaptor for providing an electrical interconnection to the telephone and for physically holding the telephone 120 or 124 in position. By providing adaptors 320 configured for different telephones 124, a wide variety of telephone configurations can be accommodated. Alternatively, the telephone interface 316 may interconnect directly to a telephone 124, without the use of an adaptor 320.

A communications interface system 104 may additionally include one or more wired interfaces 324. Although three different wired interfaces 324a-n are shown in FIG. 3, it should be appreciated that any number of wired interfaces 324 may be provided. Examples of wired interfaces 324 that may be provided include universal serial bus (USB), IEEE 1394, RS-232, intelligent transportation system databus (IDB), controller area network (CAN), Ethernet, Media Oriented Systems Transport (MOST) system or other wired interfaces. In addition to such interfaces for exchanging electrical signals, wired interfaces 324 may additionally include interfaces for enabling optical communications. A wired interface 324 may generally interconnect a communications interface system 104 to a device, to a network, or to a remote platform 120.

A communications interface system 104 in accordance with embodiments of the present invention may also include a number of wireless interfaces 328. Although three wireless interfaces 328a-n are illustrated in FIG. 3, it should be appreciated that any number of wireless interfaces 328 may be provided. Examples of wireless interfaces 328 include Bluetooth; ultra wideband (UWB); WiFi, such as IEEE 802.11a, 802.11b, and 802.11g; personal area networking, such as IEEE 802.15.3a, CDMA2000; and DATATAC, GSM/GPRS/EDGE, UMTS, Mobitex or integrated digital enhanced network interfaces. A wireless interface 328 may generally interconnect a communications interface system 104 to a device, to a network, or to a remote platform 120.

As can be appreciated by one of skill in the art, wired 324 and wireless 328 interfaces may operate in connection with or incorporate various communication protocols. Examples of such communication protocols include transport control protocol/Internet protocol (TCP/IP), and universal datagram protocol (UDP). In addition, wired 324 or wireless 328 interfaces may comprise ports 100, 111, 112 and/or 113.

Figure 4:
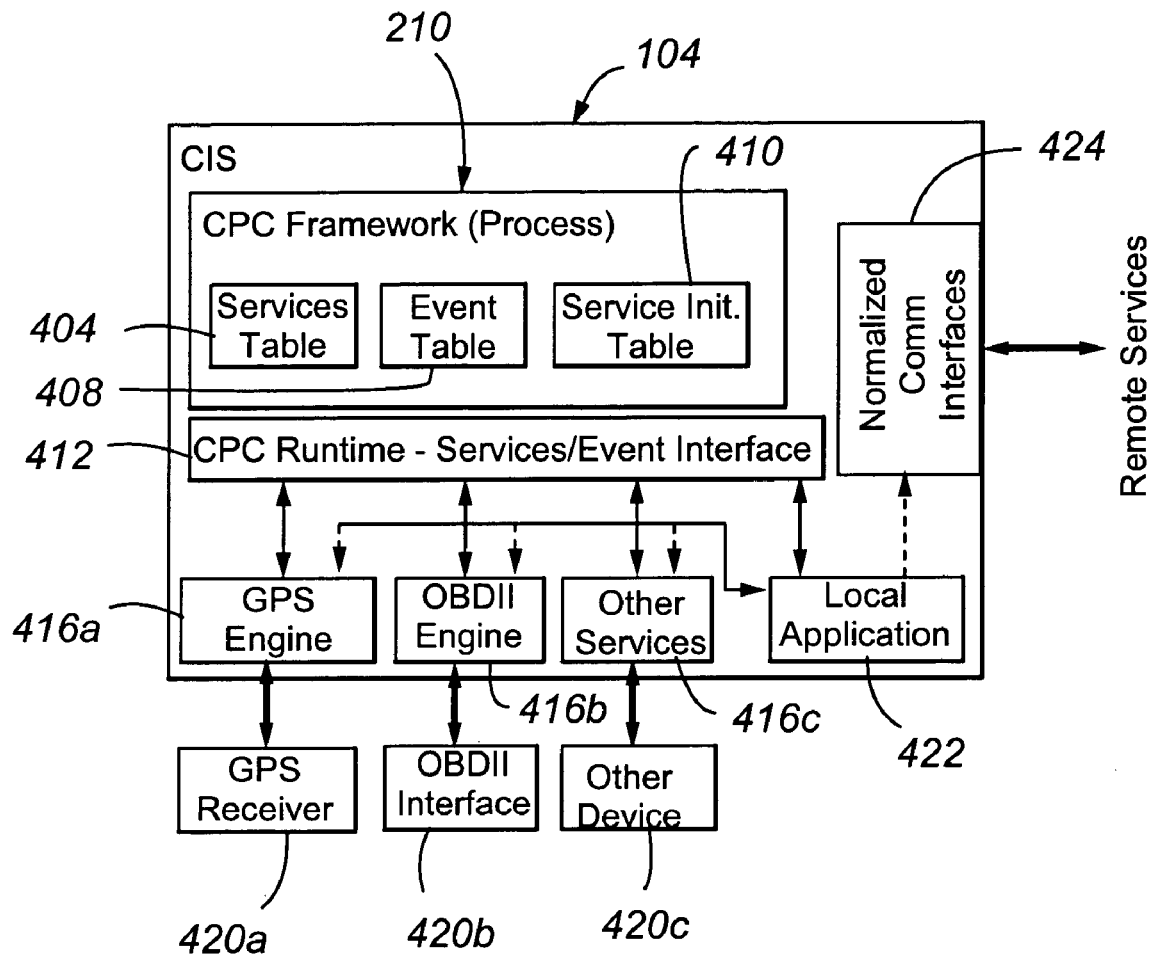
FIG. 4 is a block diagram depicting a communications interface system with interconnected devices in accordance with embodiments of the present invention.

With reference now to FIG. 4, a block diagram of a communications interface system 104 operatively interconnected to a number of devices is shown in functional block diagram form. In general, the connection framework process 210 is the central process or system of the communications interface system 104. The connection framework process 210 catalogs registered services, handles events, and controls the synchronization of information on available services and information. Alternatively or in addition event handling and the synchronization of information can be handled by facilities available from the operating system 208, 228 (see FIG. 2).

The connection framework process 210 provides a services table 404 for advertising services available from devices or applications to other devices or applications associated with the connection framework process 210. Applications such as service engines may use a service interface provided as part of the connection framework process 210 to advertise services or to advise client applications of changes in service status and availability. Services and applications can discover information and resources available to them from other services or applications by making reference to the services table 404 using a client interface provided as part of the connection framework process 210. Accordingly, the services table 404 may contain a registry of services and service descriptors, the functions to be used when accessing those services, the current status of the service, privileges required to access the service, the class and performance criteria of any associated device and other information regarding available services.

In addition, the connection framework process 210 supports an event subscription and notification scheme using an event table 408. In particular, the event scheme supported by the connection framework process 210 provides for the delivery of application specific event objects when events occur. In one or more other embodiments, instead of the connection framework process 210, the underlying OS (operating system) can provide the event objects through an event table 408. In general, these event objects contain data and/or references to executable functions. The event table 408 contains lists of events and processes subscribed to each event. When an event occurs, the connection framework process 210 checks the event table 408 for processes to be notified of the event. Qualified services and applications (i.e., services and applications with sufficient privileges) will be allowed to register to generate and receive events. Applications accessing the table will generally use a set of predefined messages (i.e., communications interface system messages 216) for the purpose of registering to receive events.

The connection framework process 210 may also provide a service initiation table 410. In general, the service initiation table 410 contains information regarding service engines. Such information may include the executable file of local service engines and applications, whether they are to be started on boot up or in response to a request from another service engine or application, and other information.

The communications process runtime services/event interface 412 provided as part of or by the connection framework process 210 controls the advertisement of services and the discovery of services. Furthermore, the communications process runtime services/event interface 412 is used by services and applications in connection with subscribing to events and broadcasting events. In general, the connection framework process 210 may record event subscriptions received from the communications process runtime services/event interface 412 as communications runtime calls in the event table 408. When an application (or service engine) generates an event, again through a communications runtime call passed across the communications process routine service/event interface 412, the connection framework process 210 checks the event table 408 and notifies each subscriber of the event. Both service engines and applications may subscribe to events. Accordingly, by providing for communications runtime calls placed through the communications runtime services/event interface 412, and by providing a services table 404 and an event table 408, the connection framework process 210, in connection with the client interface and service interface, is able to catalog requested services, synchronize the delivery of services, handle events, and control the synchronization of information on available services with any other connected applications or resources. Accordingly, it can be appreciated that the connection framework process 210 running on the communications interface system 104 functions as the central process of the communications interface system 104.

In addition, one or more service engines 416 (e.g., service engines 416a-c) may be provided for interfacing various locally connected devices 420 from which services are available to the connection framework process 210 through the communications runtime services/event interface 412 and to client applications. In accordance with further embodiments of the present invention, a service engine 416 may interface a client application to the connection framework process 210 and to services, with or without the cooperation or assistance of a port. For example, a GPS receiver 420a, onboard diagnostics II (OBD-II) interface 420b, or some other device 420c may be interconnected to the communications interface system 104 through a direct interconnection, such as provided by a port or interface with a vehicle communication bus 112 or by a direct interconnection with the device 420 through a port or interface (e.g., port 110, 111, 113, see FIG. 1A). In general, a service engine 416 presents a standard interface for applications using an interconnected service. Accordingly, a service engine 416 may function as adaptor software to adapt or translate messages in a message or data format used by the interconnected service or device providing the service 420 to the messages and message format or protocol of the connection framework process 210 and the communications runtime services/event interface 412. A service engine 416 may also format application specific messages into the format or protocol of the connection framework process and/or of a client application. In addition to the service engine 416, various local applications 422 may run on the communications interface system 104.

The communications interface system 104 may additionally provide a normalized communication interface 424. In general, the normalized communication interface 424 provides access to services on devices that are remotely connected to the communications interface system 104. As will be described in greater detail elsewhere herein, a normalized communication interface 424 allows applications (e.g., local application 422 or services provided through locally connected devices 420) to access services provided by remote devices, and allows services to be provided to remote applications. In general, a communication interface 424 maps communication technology-specific addresses to network normalized service pipes or channels. Examples of communications technologies that may be used to establish communication channels include TCP/UDP, USB, and simple serial ports. Other examples of communications technologies over which communication channels may be established through a communication interface 424 include a controller area network (CAN) bus or a Media Oriented Systems Transport (MOST) bus. By accessing service pipes or communication channels through a communication interface 424, applications are able to access local and remote services in a consistent manner. Accordingly, to the service specific functions, the normalized interfaces 424 appear very much like an Internet "socket" interface. Furthermore, as can be appreciated from the description provided herein, a communication interface may comprise or incorporate features of one or more ports 110-112 (See FIG. 1A).

Figure 5:
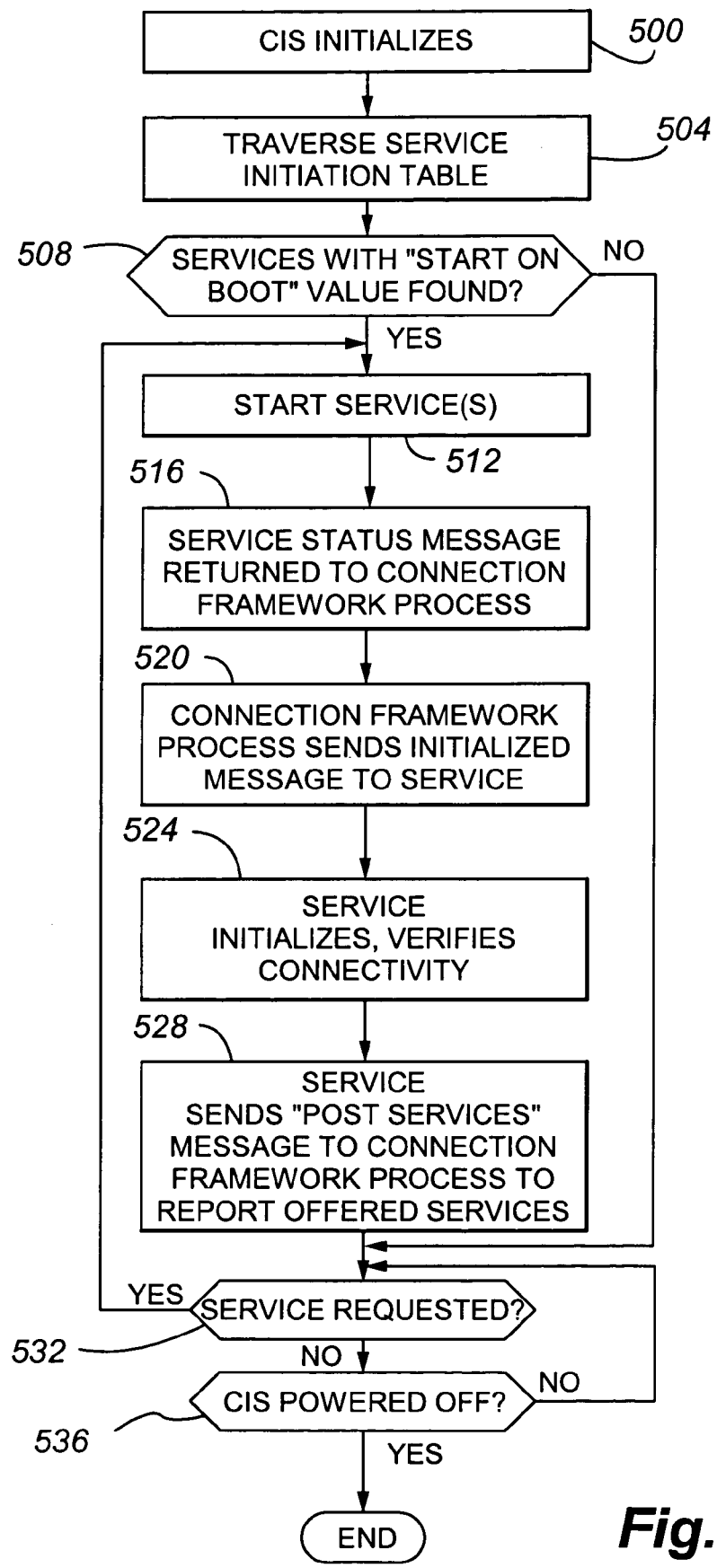
FIG. 5 is a flow chart illustrating a service initialization process in accordance with embodiments of the present invention.

With reference now to FIG. 5, a service initialization process in accordance with embodiments of the present invention is illustrated. Initially, at step 500, the communications interface system 104 initializes (i.e., boots up), for example when the system is turned on. The connection framework process 210 then traverses the service initiation table 410 (step 504). At step 508, a determination is made as to whether services having a "start on boot" value were found by the connection framework process 210. If services with a "start on boot" value have been found in the service initiation table 410, service engines 416 or other applications associated with those services are started (step 512). A service status or establish message is then returned to the connection framework process 210 by each service that has been started and a service control channel is established for each service (step 516). In return, the connection framework process 210 sends an initialize message to each service that has been started (step 520). The service or services then initialize, and verify connectivity with the connection framework process 210 (step 524). Each service may then send a "post services" message to the connection framework process 210 to report the services offered by that service for listing in the services table 404 (step 528).

After "post services" messages have been sent, or after it is determined that no services with a "start on boot" value are listed in the service initiation table 410, a determination is made as to whether a service has been requested (step 532). For example, a service may be started after the communications interface system 104 itself has been started in response to an associated device 420 being started, receiving a request from a client application 422 or some other event, such as plugging a telephone 124 into a pocket adaptor 116. If a service is requested, the process returns to step 512 to start the invoked service and enter the associated services in the services table 404.

If it is determined that no service has been requested, a determination is then made as to whether the communications interface system 104 has been powered off (step 536). If the communications interface system 104 has not been powered off, the process may return to step 532. If the communications interface system 104 is powered off, the process ends.

Figure 6:
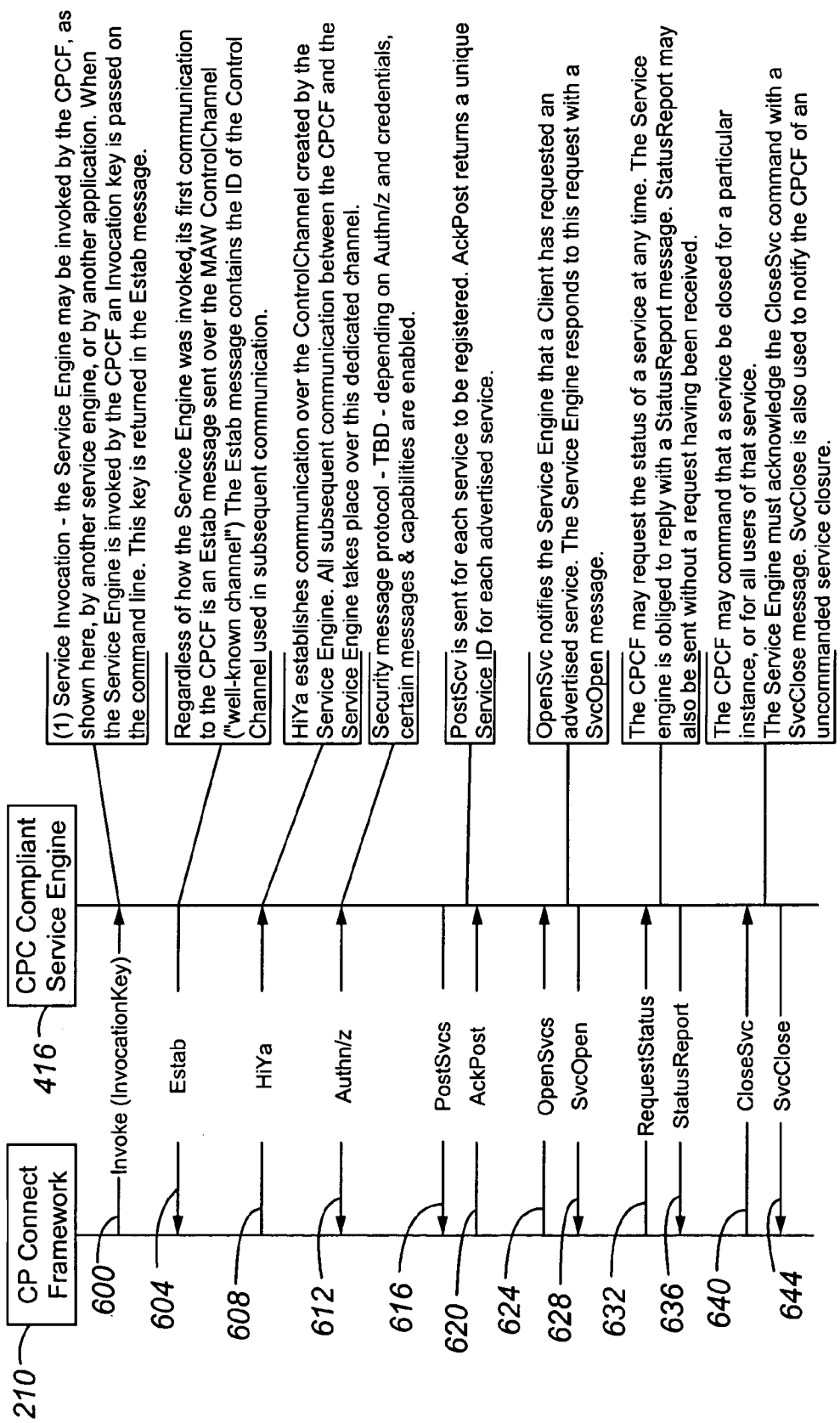
FIG. 6 illustrates a service registration process in accordance with embodiments of the present invention.

With reference now to FIG. 6, a service registration process in accordance with embodiments of the present invention is shown. In particular, an exchange of messages between a connection framework process 210 and a service engine 416 is illustrated. Initially, the connection framework process 210 sends an invoke service message to the service engine 416 being requested (step 600). In general, an invoke message may be any action required to start or access a service engine. Alternatively, an invoke message can be sent to a service engine 416 by another service engine, or by another application, such as a client application. The invoke service message includes an invocation key, which may be passed on the command line of the invoke service message. As can be appreciated by one of skill in the art from the description provided herein, an invoke message may be sent at various times, such as at system boot up, at the time a service is needed, or when a client application starts.

In reply to the invoke message, the service engine 416 returns an establish message (step 604). Regardless of how the service engine 416 was invoked, its first communication to the connection framework process 210 (i.e., the establish message) is sent over the main or public control channel of the connection framework process 210. The establish message returned by the service engine 416 contains the invocation key provided by the connection framework process 210, and also identifies the service control channel to be used in connection with further communications.

The connection framework process 210 then returns a Hi Ya message to establish communication over the service control channel created by the service engine 416 (step 608). Following establishment of the dedicated service control channel, subsequent communications between the connection framework process 210 and the service engine 416 occur over that dedicated channel.

Also following establishment of the service control channel, security messages may be exchanged (step 612). In one embodiment, such security related measures can be implemented using at least portions of the systems and/or methods of U.S. patent application Ser. No. 10/767,548, filed Jan. 28, 2004, and entitled "Secure Telematics," that is assigned to the assignee of this application and which is hereby incorporated by reference in its entirety. In general, security messages may comprise authorization and authentication service protocols. For example, the security protocols may allow the connection framework process 210 to verify the identity of an application requesting access to the service associated with the service engine 416, and verify that the application is authorized to access that service. In addition to providing data security, such procedures may also be used in connection with implementing licensing agreements regarding device, service and/or application interoperability.

A service engine 416 may post the services available through it to the connection framework process 210 by sending a post services message to the connection framework process 210 (step 616). Using the service description information and identifier that is provided as part of the post service message, the connection framework process scans the services table 404 for a matching service. If no match is found, the connection framework process allocates a new service ID, enters the service description information in the services table 404, and returns this new service ID in an acknowledge post message (step 620). If a match between the service being posted and a service already entered in the services table 404 is found, the connection framework process 210 returns the existing service ID to the service engine 416 in an acknowledge post message. By performing this matching function, the connection framework process 210 assures that service IDs are unique, and that there are no duplicate service advertisements contained in the services table 404. For example, when a service engine 416 is restarted, or in connection with services provided by a start on demand service engine 416, entries in the services table 404 for a service will exist when a corresponding post service message is received. Accordingly, by matching the contents of a post service message to any existing service advertisements, the connection framework process 210 can control the proliferation of service IDs and support error recovery. In accordance with embodiments of the present invention, all service engines 416, regardless of how they have been invoked, use post services messages and the reply acknowledge post messages to synchronize service advertisement information with connection framework process assigned service IDs.

When a client, such as a client local application 422, requests an advertised service (i.e., a service listed in the services table 404), an open service message is sent by the connection framework process 210 to the applicable service engine 416 (step 624). The service engine responds to the request to open an advertised service available through that service engine 416 with a service open message (step 628).

The connection framework process 210 may request the status of a service from an associated service engine 416 at any time using a request status message (step 632). The service engine 416 replies with a status report message (step 636). A status report message may also be sent by a service engine 416 without a request status message having been received. Accordingly, a service engine 416 may send a status report message periodically, or after the occurrence of certain events.

The connection framework process 210 may command a service engine 416 to close a service for a particular instance (i.e., in connection with a particular client), or for all users of an associated service using a close service message (step 640). Accordingly, a close service message may identify one or more instances of a provided service. In reply to a close service message, the service engine 416 returns a service close message as an acknowledgment (step 644). A service engine 416 may also send a service close message to the connection framework process 210 to notify the connection framework process 210 of an uncommanded service closure.

Figure 7:
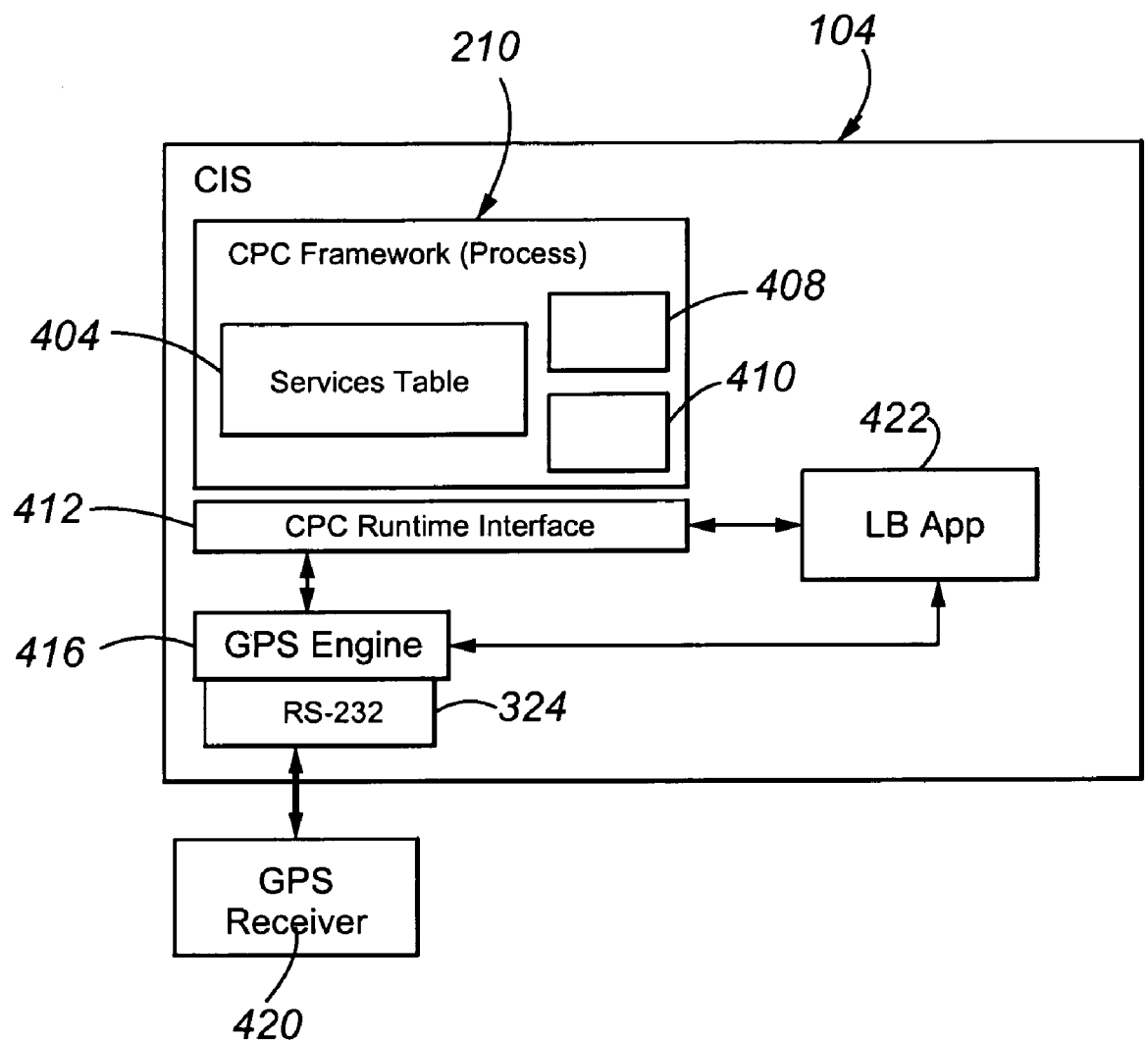
FIG. 7 is a block diagram depicting a local application accessing data from an interconnected device in accordance with embodiments of the present invention.

With reference now to FIG. 7, a block diagram illustrating a local client application 422 accessing a service provided by a device 420 that is directly interconnected to a communications interface system 104 through a wired interface 324 is shown. More particularly, the example of FIG. 7 illustrates a location based client application 422 accessing data from a GPS receiver device 420 interconnected to the communications interface system 104 by a RS-232 type wired interface 324. The message set used for communications between the connection framework process 210, the service engine 416, and the application 422 may be the same as those described in connection with the examples such as those given in connection with various of the figures provided herein. That is, the use of a wireline interface 324, such as the RS-232 serial interface in the example of FIG. 7, does not alter the messages that the participants in the communication are required to use. Accordingly, modifications to, for example, an application 422, are not required in order to communicate with devices 420 interconnected to the communications interface system 104 using different interfaces. In addition, a device 420, that is capable of supporting messages corresponding to those used by the communications interface system 104, such as the GPS receiver illustrated in FIG. 7, need not be specially modified in order to operate in association with an application 422. The example arrangement illustrated in FIG. 7 demonstrates that, by providing a service engine 416 that incorporates or operates in connection with the RS-232 wired interface 324 necessary for communications with the device 420 over the RS-232 serial interconnection, neither the device 420 nor the application 422 needs to be modified in order to interoperate. That is, by providing a suitable service engine 416, an application 422 associated with the communications interface system 104 can be operatively connected to a separate device 420 without prior knowledge or special adaptation for the type of interface used by the device 420.

Figure 8:
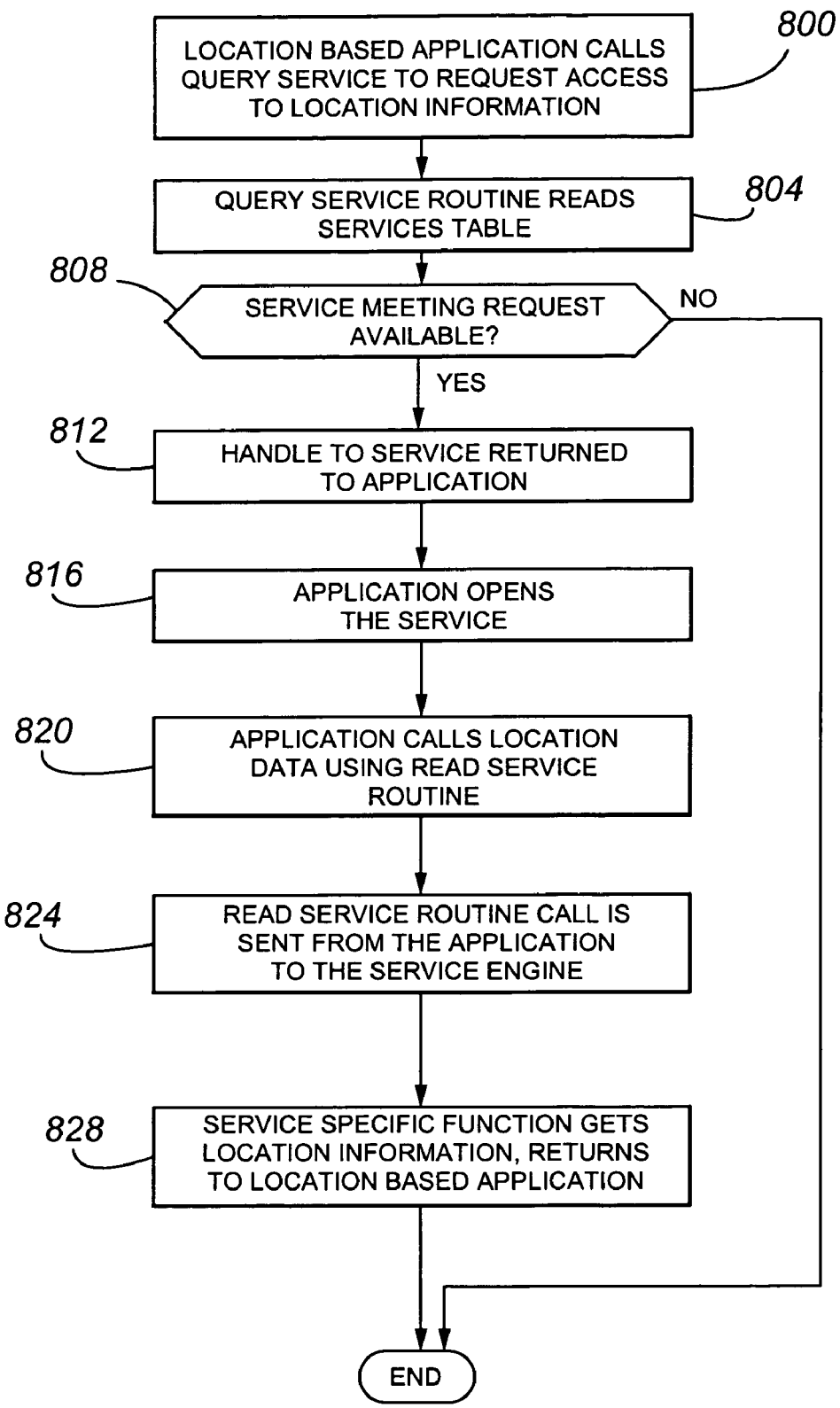
FIG. 8 is a flowchart depicting aspects of the operation of a communications interface system in facilitating access to an interconnected device by a local application in accordance with embodiments of the present invention.

With reference now to FIG. 8, the operation of a communications interface system 104 in connection with providing a local application 422 access to a service provided by an interconnected device, 420 for example, as generally illustrated in FIG. 7, is depicted. For illustration purposes, the local application 422 in the present invention is a client location based application, and the service comprises location information provided by a GPS device 420. Initially, at step 800, the location based application 422 calls a query service routine requesting access to normalized location data from a GPS device. The query service routine causes the connection framework process 210 to read the services table 404 (step 804). At step 808, a determination is made as to whether a service meeting the request from the location based application 422 is available. If the requested service is available, and assuming that the application 422 is properly authenticated and authorized, a handle to the requested service is returned to the application, for example in the form of a service list identifying the available service or services (step 812). The application then opens the service (e.g., by contacting the service engine 416) using an open service message that includes a specification of the handle to the service, and service resources are allocated to support the location based application 422 (if required) (step 816).

At step 820, the location based application 422 calls location data using a read service routine. In particular, a read service message specifying the handle associated with the open service is sent from the location based application 422 to the service engine 416 (step 824). The service specific send service message is then formatted as required by the link between the service engine 416 and the device 420, and the requested information is obtained from the device 420 and is returned to the location based application by the service engine 416 (step 828). The information may be returned to the location based application 422 by writing it to a buffer or object provided by the application 422. After returning the requested information to the application at step 828, or after determining that a service meeting the application's request is not available at step 808, the process may end.

Figure 9:
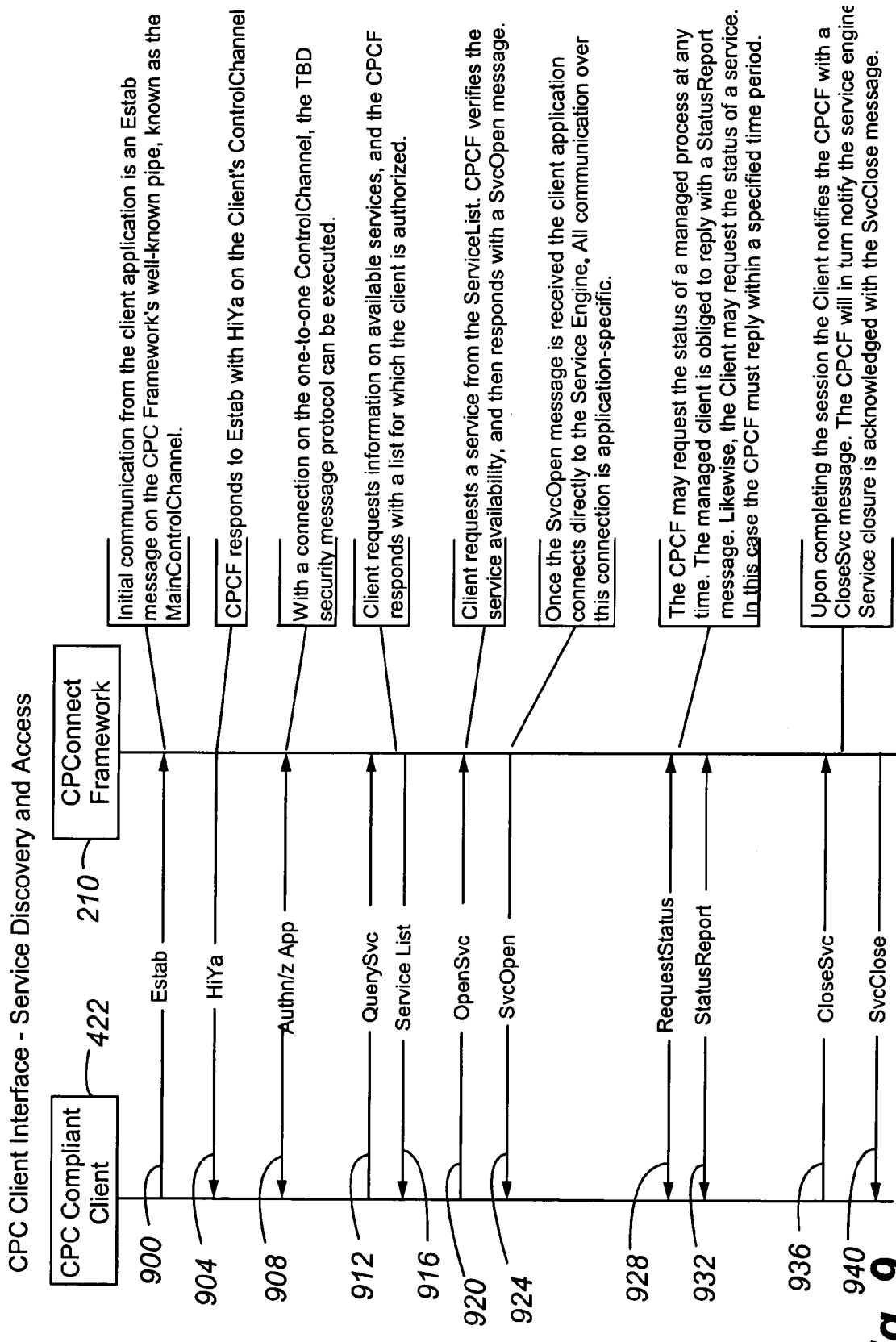
FIG. 9 illustrates a services discovery process in accordance with embodiments of the present invention.

With reference now to FIG. 9, a service discovery process in accordance with embodiments of the present invention is shown. Initially, at step 900, a client application 422 sends an establish message using the public or main control channel of the connection framework process 210. In response, the connection framework process 210 sends a HiYa on the client application's control channel that was provided to the connection framework process 210 as part of the establish message (step 904). The establish and HiYa messages used in connection with steps 900 and 904 to establish communications between the connection framework process and the client application 422 as part of a service discovery process may be the same as the establish and HiYa messages used at steps 604 and 608 of the service registration process described in connection with FIG. 6. After a dedicated client control channel has been established, authentication and authorization steps may be performed by an exchange of authorization and authentication messages (step 908).

Provided that any required authentication and authorization is successfully completed, service discovery is initiated with a query service message sent from the client application 422 to the connection framework process (step 912). In response to the client application's 422 request for information on available services (in the form of a query service message), the connection framework process 210 returns a service list message containing a list of services that the client application 422 is authorized to receive (step 916). In accordance with embodiments of the present invention, the query service message sent by the client application 422 may specify a particular service type or class, may query for local services, for all services available to remote platforms, for all available services, or for other categories of services available in connection with the system.

If a service requested by the client application 422 is available, the client application 422 may request the service using an open service message (step 920). The connection framework process 210, upon receiving the open service message, may verify that the requested service is available, and respond with a service open message (step 924). After receiving the service open message, the client application 422 connects directly to the service engine 416. In accordance with embodiments of the present invention, communications between the client application 422 and the connection framework process 210 use the client control channel that is established using the establish and HiYa messages. Furthermore, where a client control channel is established in connection with an application 422 as part of registering services (i.e., in connection with service engine 416 functions of an application that may also consume services as a client application 422), that channel may be used to request services. Similarly, where a control channel is established between an application seeking services (i.e., as a client application 422) and the connection framework process 210, the dedicated channel established in connection with the service discovery process may be used by the application to report services when such application is operating as a service engine 416. Accordingly, once a dedicated channel is established between an application 416 and/or 422 and the connection framework process 210 in connection with a first process, there is no need to establish a separate connection for use in a second process between the application 416 and/or 422 and the connection framework process 210.

The connection framework process 210 may request the status of a managed process or client application 422 at any time using a request status message (step 928). In addition, the client application 422 may request the status of a service from the connection framework process 210 at any time (step 928). When a client application 422 receives a request status message from the connection framework process 210, the client application 422 is obliged to reply with a status report message (step 932). Similarly, where the connection framework process 210 receives a request status message from a client application 422, the connection framework process 210 must reply with a status report message to the client application 422 (step 932). In general, a status report message 932 must be sent within a specified period of time by the receiving entity after receipt of the request status message.

When the client application 422 no longer requires the service, or when the session is otherwise complete, the client application 422 notifies the connection framework process using a close service message (step 936). The connection framework process in turn notifies the service engine 416. In addition, the connection framework process 210 acknowledges closure of the service by sending a service closed message (step 940) to the client application 422.

Figure 10:
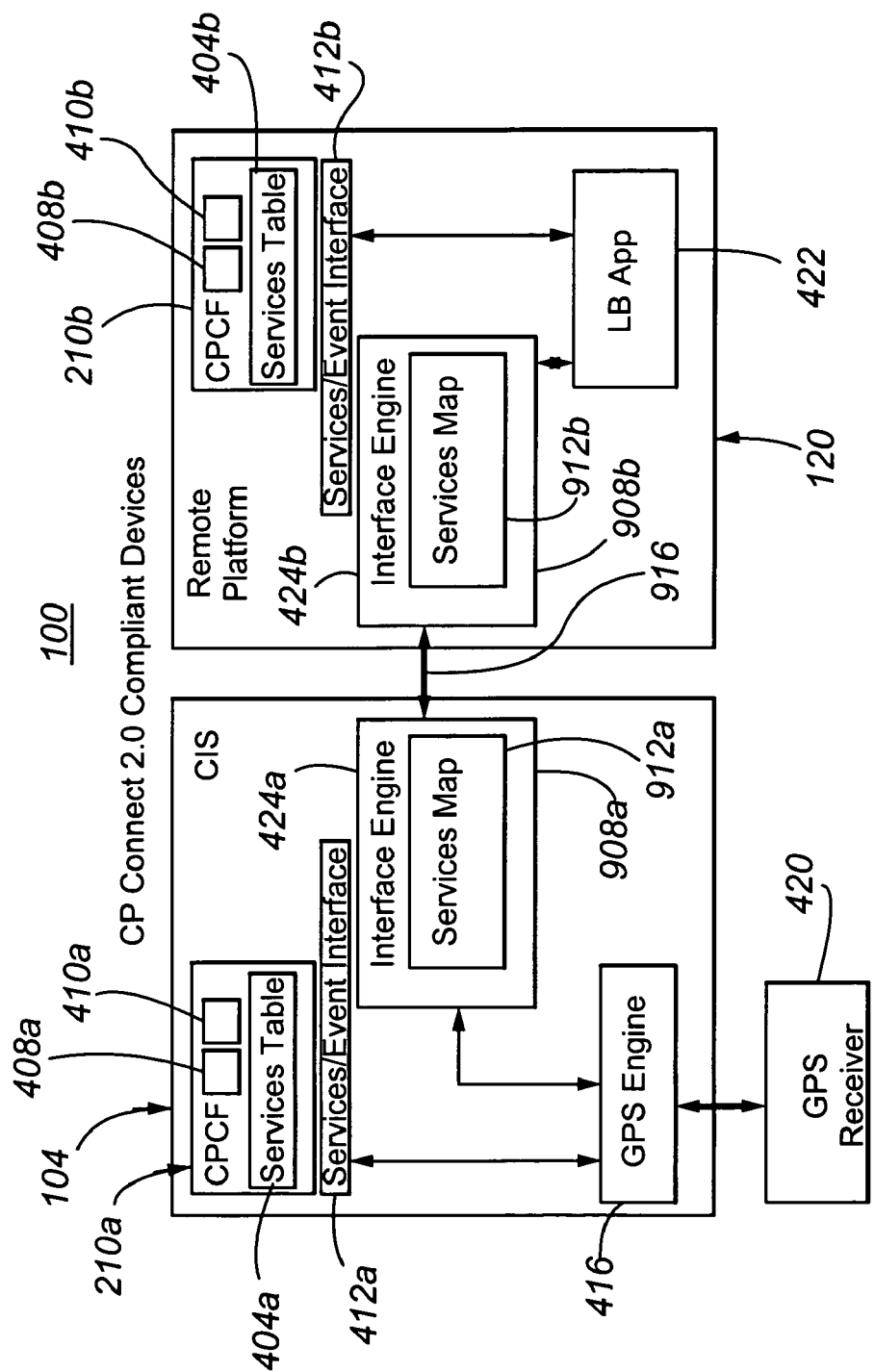
FIG. 10 is a block diagram depicting a remote platform accessing data from a device in accordance with embodiments of the present invention.

With reference now to FIG. 10, a system 100 in which a communications interface system 104 is operating in connection with a remote platform 120 is illustrated. In general, the communications interface system 104 includes a connection framework process 210. A services table 404, event table 408, and service initiation table 410 are maintained by the CIS 104. Although shown in FIG. 10 as being included in its connection framework process 210, some or all of the tables may be provided by another process or application, or by the operating system. In addition, the communications interface system 104 includes a connection runtime services/event interface 412. One or more service engines 416 may also be running on the communications interface system 104. For example, as shown in FIG. 10, a service engine 416 comprising a GPS engine may be included. A device 420 may be interconnected to the service engine 416. For example, as illustrated in FIG. 10, a GPS receiver 420 may be in communication with the GPS engine 416.

The communications interface system 104 may also include normalized communication interfaces 424. In accordance with embodiments of the present invention, a normalized communication interface 424a may comprise an interface engine or manager 908a. In one embodiment, the normalized communication interface 424a can include a link selection apparatus or module for determining a selected communications channel to be used, as described in U.S. Pat. No. 6,122,514 "Communications Channel Selection," and assigned to the same assignee as this application. A services map 912a may be maintained by the interface engine 908. In general, the communications interface 424a connects the communications interface system 104 to a remote platform 120 via a communication link 916. The communication link 916 may comprise any communication interconnection suitable for transferring digital data and instructions. Accordingly, examples of communication links 916 include Bluetooth or other wireless connections (in which case the interface managers 424 comprise wireless interfaces 328) or USB or other wired connections (in which case the interface managers 424 comprise wired interfaces 324). An interface engine 908 can be initiated or started in a variety of ways, including by means of a USB driver.

The remote platform 120 generally includes a connection framework process 210b containing a services table 404b, an event table 408b and a service initiation table 410b. The remote platform 120 may additionally provide a services/event interface 412b and a normalized communications interface 424b. The normalized communications interface 424b may comprise an interface engine or manager 908b in connection with which a services map 912b is maintained. In addition, one or more applications 422 may run on the remote platform 120.

The interface engines 908 normalize external (off platform) communications. In particular, the interface engines 908 map communication technology specific addresses to network normalized service pipes. Examples of communications technologies that may be supported by interface engines 908 include TCP/UDP, USB, and simple serial ports. In addition, various bus technologies, such as CAN may be supported. Using the service pipes or communication links 916, applications 422 are able to access local and remote services in the same manner. That is, whether a service is operated in connection with a service engine 416 running on a platform that is local to the client application 422 or remote to the client application 422 is immaterial as a result of the operation of the interface engines 908. In addition, the particular communication link 916 between platforms (i.e., between a CIS 104 and a remote platform 120) is immaterial.

Where an application 422 is running on a platform 104 or 120 that is remote (i.e., separate) from the platform 104 or 120 in connection with which a service is running or available, the interface engine 908 associated with the platform 104 or 120 associated with the service serves as a proxy for the remote application 422. In addition, with respect to the advertisement of services, an interface engine 908 running on a platform 104 or 120 will advertise the services available from the remote (i.e., the other) platform. In addition, an interface engine 908 monitors the interface control port appropriate for the connection technology used by the communication link 916 and processes any control messages that are received. Interface engines 908 may also provide or support the communication pipe established over the communication link 916 through which client applications and services on different platforms 104, 120 can connect to one another. In particular, the interface engines 908 operate to provide a connection that appears like a connection to a local service engine to the local application 422. Furthermore, when a remote application 422 requests a local service, the local interface engine 908 must establish a communication pipe to the local service. With communications established between the interface engine 908 and the local service engine 416, the interface engine 908 may bridge data across the communication link 916 between the local platform (e.g., a CIS 104) and the remote platform (e.g., remote platform 120). In addition, an interface engine 908 provides a bridge between the local inner process communication technology or protocol and the communication technology or protocol used by the communication link 916 between the platforms 104, 120. The bridging function provided interface engines 908 includes message framing, buffering, and flow control.

Figure 11:
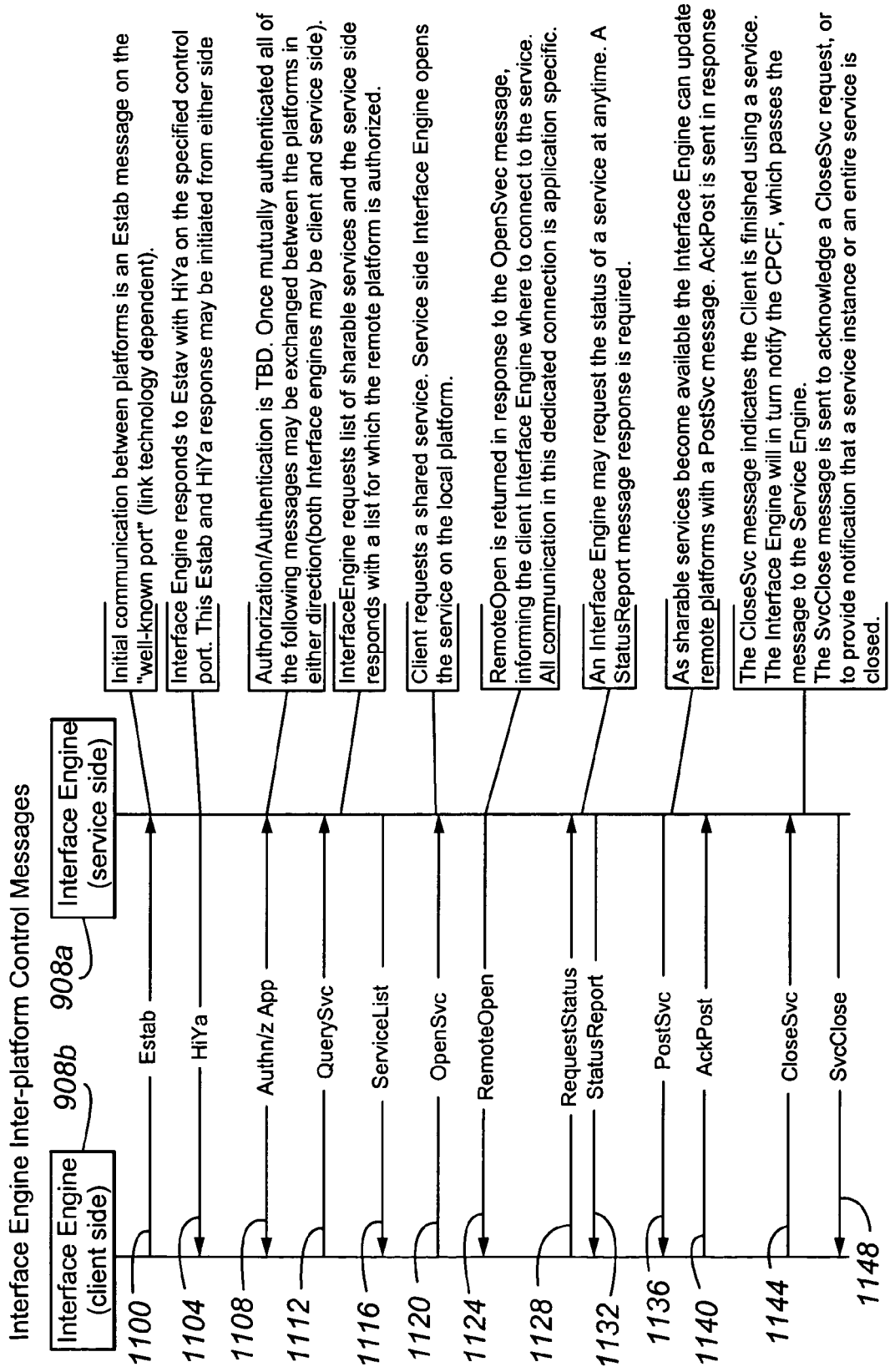
FIG. 11 illustrates inter-platform control message processes in accordance with embodiments of the present invention.

Interface engines 908 synchronize with the external platform or platforms 104 or 120 to which they connect. This synchronization may include a full exchange of information on sharable services between platforms 104, 120, or a request for a specific service. With reference now to FIG. 11, a process for synchronizing platforms 104, 120 in accordance with embodiments of the present invention is illustrated. For ease of description, the service will be assumed to be associated with a CIS 104, while the client application 422 requesting services will be assumed to be associated with a remote platform 120 interconnected to the CIS 104 by a communication link 916 (see FIG. 10).

As shown in FIG. 11, the initial communication between platforms 104, 120 is an establish message on a public channel or port (step 1100). In general, the identity of the channel or port will depend on the technology or protocol of the communication link 916. In the example process illustrated in FIG. 11, the establish message is sent by the interface engine 908b running on the remote platform 120. The interface engine 908a running on the CIS 104 receives the establish message, and responds with a HiYa message on the control port specified by the sending interface engine 908b as part of the establish message (step 1104). If the establish message was sent by the service engine 908a on the CIS 104, the interface engine 908b running on the remote platform 120 would respond with the HiYa message. Authorization and authentication messages may then be exchanged between the platforms 104, 120 (step 1108).

At step 1112, the interface engine 908b running on the remote platform 120 requests a list of sharable services. The interface engine 908a on the CIS 104 responds with a service list message, containing a list of services that the remote platform 120 is authorized to access (step 1116). In particular, functioning as a proxy for a client application 422 that may not be identified, and that may be prospective, the service side interface engine 908a obtains the list of services that can be shared with a remote platform 120 from the services table 404a established by or associated with the communication framework process 210a running on the CIS 104. The services list may be specific to a requesting application 422 associated with the remote platform 120 when such information is made available to the interface engine 908a running on the CIS 104. The interface engine 908b on the remote platform 120 may provide the services list received from the CIS 104 to the connection framework process 210b on the remote platform 120 for placement in the associated services table 404b.

When a client application 422 running on the remote platform 120 requests a shared service, the interface engine 908b running on the remote platform 120 sends an open service message to the interface engine 908a associated with the CIS 104 (step 1120). In general, the open service message identifies the requested service, and may also identify the requesting client application 422. In response to the open service message, the service side interface engine 908a opens the service on the local platform 104. In general, the interface engine on the local platform 104, acting as the proxy for the client application 422 on the remote platform 120, opens the requested service in the same manner that a client application 422 running on the local platform 104 would open the service (see, e.g., FIG. 6 and the associated description). A remote open message is returned by the local or service side interface engine 908 to inform the client or remote interface engine 908b where to connect to the requested service (step 1124). The identified port or communication channel is then used to communicate application specific messages.

An interface engine 908 may request the status of a service on another platform at any time. This is done by sending a request status message (step 1128). In connection with the example process of FIG. 11, the request status message may be sent by the client side interface engine 908b regarding the status of the services reported by the service side interface engine 908a. In reply to the request status message, the service side interface engine 908a returns a status report message (step 1132). Information contained in the status report message may be obtained by the service side interface engine 908a by sending a request status message to the service engine 416 associated with the service, the status of which has been requested.

As (or if) additional sharable services become available, an interface engine 908 can notify other platforms. For example, if additional services become available from the CIS 104, the service side interface engine 908a can send a post service message listing those services (step 1136). In reply to a post services message, a receiving interface engine 908b sends an acknowledge post message (step 1140).

When a client application 422 is finished using a service, the client side interface engine 908b sends a close service message to the service side interface engine 908a (step 1144). The service side interface engine 908a will in turn notify the connection framework process 210a using the interface engine's dedicated control channel. The connection framework process 210a then passes the message to the service engine 416. In reply to a close service message, a service side interface engine 908 sends a service closed message (step 1148). A service closed message may also be sent to provide notification that a service instance is closed (i.e., that the provision of a service with respect to a particular client application is closed) or that an entire service is closed.

Although the example provided in connection with FIG. 11 describes one interface engine 908a as a service side interface engine, and the other interface engine 908b as a client side interface engine, it should be appreciated that embodiments of the present invention are not so limited. In particular, both interface engines 908a and 908b may act as service clients and service providers. In such situations, the messages illustrated in connection with FIG. 11 will be passed in both directions.

Figure 12:
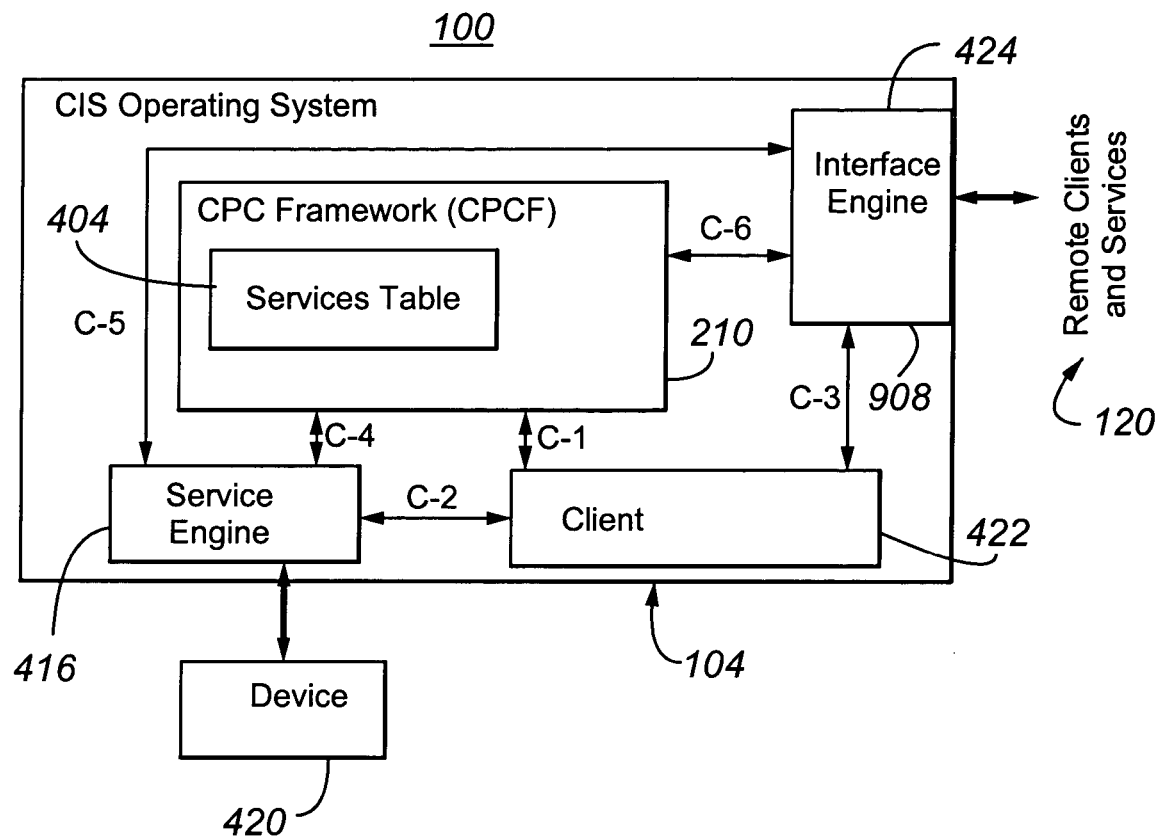
FIG. 12 depicts communication channels in accordance with embodiments of the present invention.

With reference now to FIG. 12, various communication channels or logical connections between components of a system 100 are illustrated. In particular, FIG. 12 summarizes various of the communications channels or pipes discussed with respect to the transmission of messages and data between different entities or components of a system 100. A client application 422 communicates with a local connection framework process 210 directly over communication channel C-1 in order to discover services available to the application 422. In particular, a client application 422 initially establishes communications with the connection framework process 210 using an establish message sent directly to the communication framework process 210 on the public control channel of the communication framework process. After a client application 422 has established communications with a local connection framework process 210, subsequent communications between those entities can use the control channel of the client application 422. In particular, messages may be passed between the client application 422 and the local connection framework process 210 directly over channel C-1 in order to discover available services and to request a service included in a service list passed to the client application 422 in response to a query service message. After the connection framework process 210 has responded to an open service message by sending a service open message directly to the client application 422 over channel C-1, the client application 422 may connect directly to the service engine 416 associated with the requested service.

Communications between a client application 422 and a service engine 416 are represented in FIG. 12 by communication channel C-2. In general, communications passed along communications channel C-2 are application specific. That is, the format of messages and data are determined by the service engine 416 or the local application 422, rather than by messages established as part of the connection framework process 210 (e.g., control messages 216). In accordance with embodiments of the present invention, the service engine 416 handles basic message and data formatting and control of the physical link between the device 420 that makes the service available and the service engine 416 interconnected to the device. Accordingly, such functions need not be handled by the client application 422. In accordance with embodiments of the present invention, the service engine 416 may handle layers 1-4 of the standard network communications stack model.

Where a client application 422 has, through the connection framework process 210, subscribed to a service available on a remote platform 120, communications channel C-3 between the client application 422 and the interface engine 908 (provided as part of a communication manager 424) may be used. In particular, channel C-3 is used after a service open message with respect to a remote service has been received by the client application 422. Like messages and data passed over the communication link C-2 between a local service engine 416 and a client application 422, the messages and data passed over communication link C-3 between the interface engine 908 and the client application 422 may be application specific. In particular, the interface engine 908 appears to the client application 422 as a local service engine 416. Furthermore, the client application 422 need not be aware of the communication link technology 916 used to interconnect the CIS 104 to the remote platform 120. In particular, the formatting of application specific messages into the appropriate protocol, and the control of the physical connection, is handled by the interface engine 908. In accordance with embodiments of the present invention, layers 1-4 of the standard network model are handled by the interface engine 908.

Service engines 416 communicate directly with the connection framework process 210 in connection with the advertisement of available services. Such communications are passed along communication channel C-4. In addition, the direct interconnection between a service engine 416 and the local connection framework process 210 can be used to carry request status and status report messages. Other messages that may be carried between the connection framework process 210 and the service engine 416 include instructions to close a service for all applications or for a particular application 422. In general, after an establish message is sent containing the identity of the control channel to be used, communications between a service engine 416 and the local connection framework process 210 use the control channel specified by the service engine 416.

A service engine 416 may also communicate directly with an interface engine 908 over communication channel C-5, for example when providing services to a client application 422 running or associated with a remote platform 120. In general, the interface engine 908 serves as a proxy for the client application 422 on the remote platform 120, allowing application specific messages and data to be passed between the service engine 416 and the interface engine 908, for delivery to the remote platform 120 and the client application 422.

The connection framework process 210 may also communicate directly with the interface engine over channel C-6. In general, communications between a connection framework process 210 and an interface engine 908 occur in connection with the advertisement of services available on the CIS 104 to a remote platform 120, and in connection with querying the remote platform 120 for services available on the remote platform.

Figure 13:
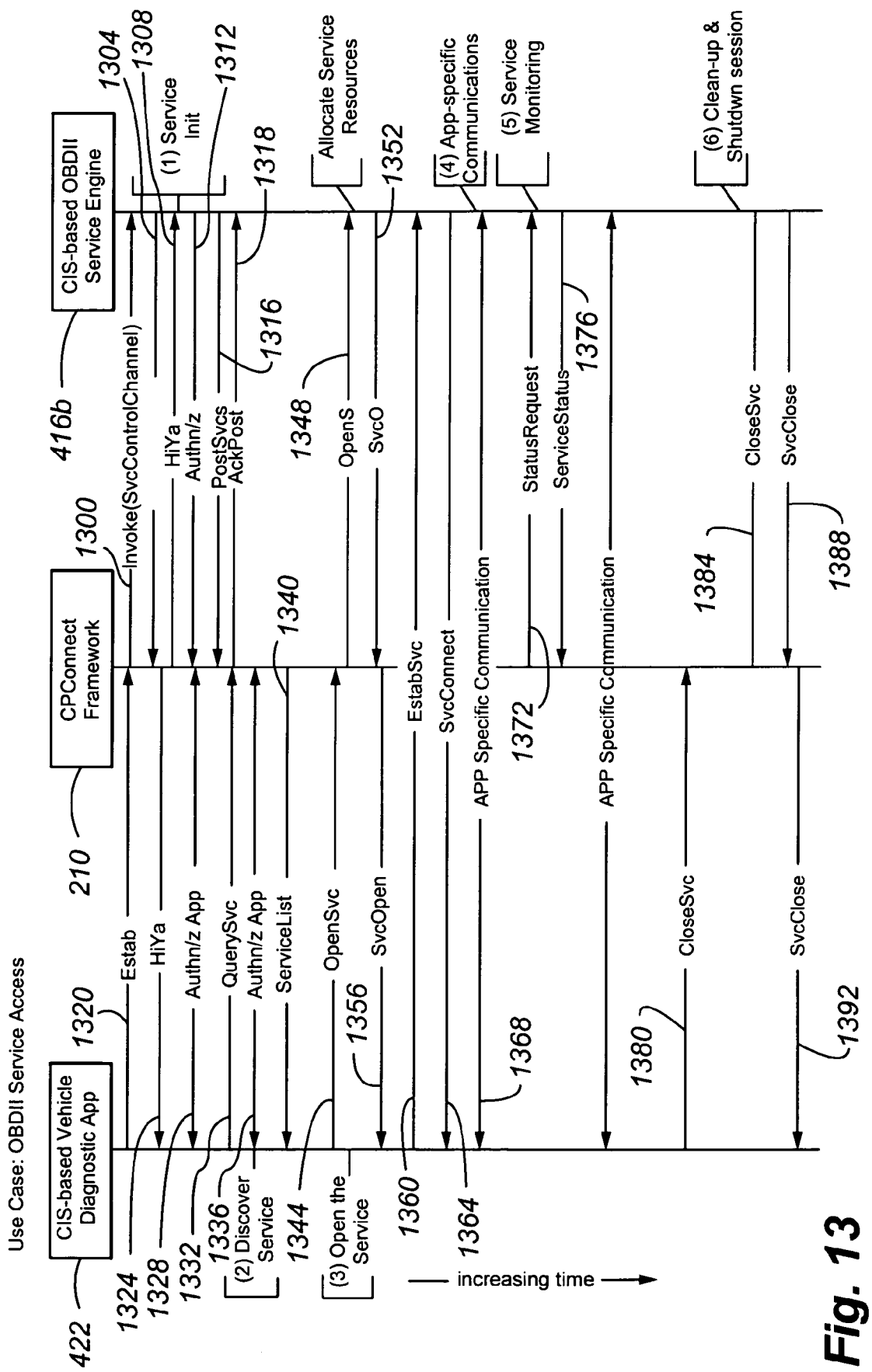
FIG. 13 depicts information and message flows in connection with establishing access to a service in accordance with embodiments of the present invention.

With reference now to FIG. 13, the establishment of access to a service by a client application is illustrated. According to the example illustrated by FIG. 13, the service to be accessed is an onboard diagnostics II service engine 416b running on the communications interface system 104 platform itself, and is accessed by a local application 422 comprising a vehicle diagnostic application (see FIG. 4). Initially, the connection framework process 210 sends an invoke service control channel message to the service engine 416b, which includes a command line argument specifying the name of the service control channel created for use by the service engine 416b (step 1300). In response, and with the service engine 416 running, the service engine connects to the service control channel that has been specified by the connection framework process 210, and sends an establishing message containing the identity of the service control channel for the service engine 416b (step 1304). The connection framework process 210, sends HiYa message to establish communication over the control channel and to command the service 412b to perform any service specific initialization (step 1308). The service engine 416b then initializes, verifies connectivity to the device providing the service (i.e., the onboard diagnostic system II (OBD-II) interface 420b), and authentication and authorization is performed (step 1312). The service engine 416b then sends a post services message to the connection framework process 210 to report the services that are offered by the service engine 416b (step 1316). These services (or the single service offered through the service engine) are listed in the services table 404. An acknowledge post message is sent in response to the post services message (step 1318). The acknowledge post message communicates the service identifier (service ID) assigned to the service to the service engine 416b.

The local application 422, in the present example a vehicle diagnostic application, may be invoked by a user or by another process. Upon being invoked, the local client application 422 sends an establish message to the connection framework process 210 on the public control channel (step 1320). The connection framework process 210 responds with HiYa message on the clients control channel (step 1324), and authentication and authorization is performed (step 1328). As illustrated in FIG. 13, the client application 422 may establish communications with the connection framework process 210 at about the same time that a service engine 416 is establishing communication with the connection framework process 210. Alternatively, communications between the various entities may be established at different points in time. With a dedicated service control channel now established, the local application 422 sends a query service message to the connection framework process 210 (step 1332). The query service message may include descriptors such as "service class" and "service type" to specify the requested service.

In reply to the query service message, the connection framework process 210 connects to the application's communication channel. Additional authorization and authentication service protocols may then be processed (step 1336). In particular, the connection framework process 210 may verify the identity of the application requesting access to the service, and verify that the application is authorized to access the service. Therefore, in accordance with embodiments of the present invention, authorization may be required before service queries are allowed. In addition to providing data security, such procedures may be useful in connection with implementing licensing agreements regarding device, service and/or application interoperability. In one embodiment, such security related measures can be implementing using at least portions of the systems and/or methods of U.S. patent application Ser. No. 10/767,548 filed Jan. 28, 2004 and entitled "Secure Telematics," that is assigned to the assignee of this application and which is hereby incorporated by reference in its entirety.

After the application 422 has been authenticated and authorized, the connection framework process 210 sends a list of services as part of a service list message that are shown as being available in the services table 404 and that match the service type and class requested by the application 422 (step 1340). In accordance with embodiments of the present invention, only those services that the application has sufficient privileges to utilize will be revealed to the application 422.

The application 422 then identifies a service in the list received from the connection framework process 210 that meets the application's requirements. Typically, the list of services will contain only a single service, although a number of services may be listed if more than one service meets the criteria of the applications request. The application 422 communicates its selection to the connection framework process 210 using an open service message identifying the selected service (step 1344). Upon receiving the open service message, the connection framework process 210 looks up the service ID received from the application 422 and sends an open command message to the registered service engine (in the present example the OBD-IL service engine 416*b*) (step 1348). Included in the message sent by the connection framework process 210 to the service engine 416*b* is an instance key generated by the connection framework process 210 used to identify the requesting application 422. In response to receiving the open service command, the service engine 416*b* performs any service specific initialization, and allocates any connection specific resources required to provide the requested service. In addition, the service engine 416*b* creates a service instance communication pipe to be used by the application 422 to access services. The name or identifier of this communication channel is sent to the connection framework process 210 in a service open message (step 1352). A service open message is then sent from the connection framework process 210 to the application 422, which contains the instance key assigned by the connection framework process 210 and the service communication channel name or identifier (step 1356).

The identity of the communication channel for the service engine 416*b* now communicated to the application 422, direct communications between the application 422 and the service engine 416*b* can commence. To initiate direct communications, the application 422 sends an establish service message directly to the service engine 416*b* (i.e., using communication channel C-2 in FIG. 12) (step 1360). The service engine 416*b* replies to the application 422 with a service connect message (step 1364). Alternatively, if the instance key included in the establish service message does not match or another application has connected to the service engine 416*b* using the same instance key, the service engine 416*b* may deny the connection and report an error to the connection framework process 210. Provided that the establish service and service connect messages are successfully exchanged, application specific communications between the application 422 and the service engine 416*b* may then commence (step 1368). In accordance with other embodiments of the present invention, control messages such as establish service and service connect messages are not required in order to begin direct communications between a service and a client application. Application specific communications may include the delivery of information from the service engine 416*b* to the application 422. Alternatively or in addition, the communication may comprise the exchange of information between the application 422 and the service engine 416*b*. For instance, in connection with the present example, the application 422 may obtain vehicle performance parameter information from the service engine 416*b*.

In addition or as an alternative to sending messages to an application 422 using the established communication channel, a service may provide or broadcast information as an event. The connection framework process 210, in response to receiving such an event, may then reference the event table 408 to determine which application or applications 422 should be notified of the event or should have information comprising the event delivered to them.

The connection framework process 210 may periodically request the status of the service engine 416 by sending a status requested message to the service engine 416 (step 1372). In reply, the service engine 416 sends a service status message (step 1376). The status request and service status messages are sent and received using the service engine's control channel. As illustrated in FIG. 13, status request messages may be interspersed with application specific communications.

When the application 422 no longer requires access to the service, a close service message is sent from the application 422 to the connection framework process 210 (step 1380), which in turn notifies the service engine 416 (step 1384). The service engine 416 acknowledges the request (step 1388) and cleans up any session specific resources. The service engine 416 then notifies the connection framework process 210 that the session has terminated (step 1392).

Figure 14:
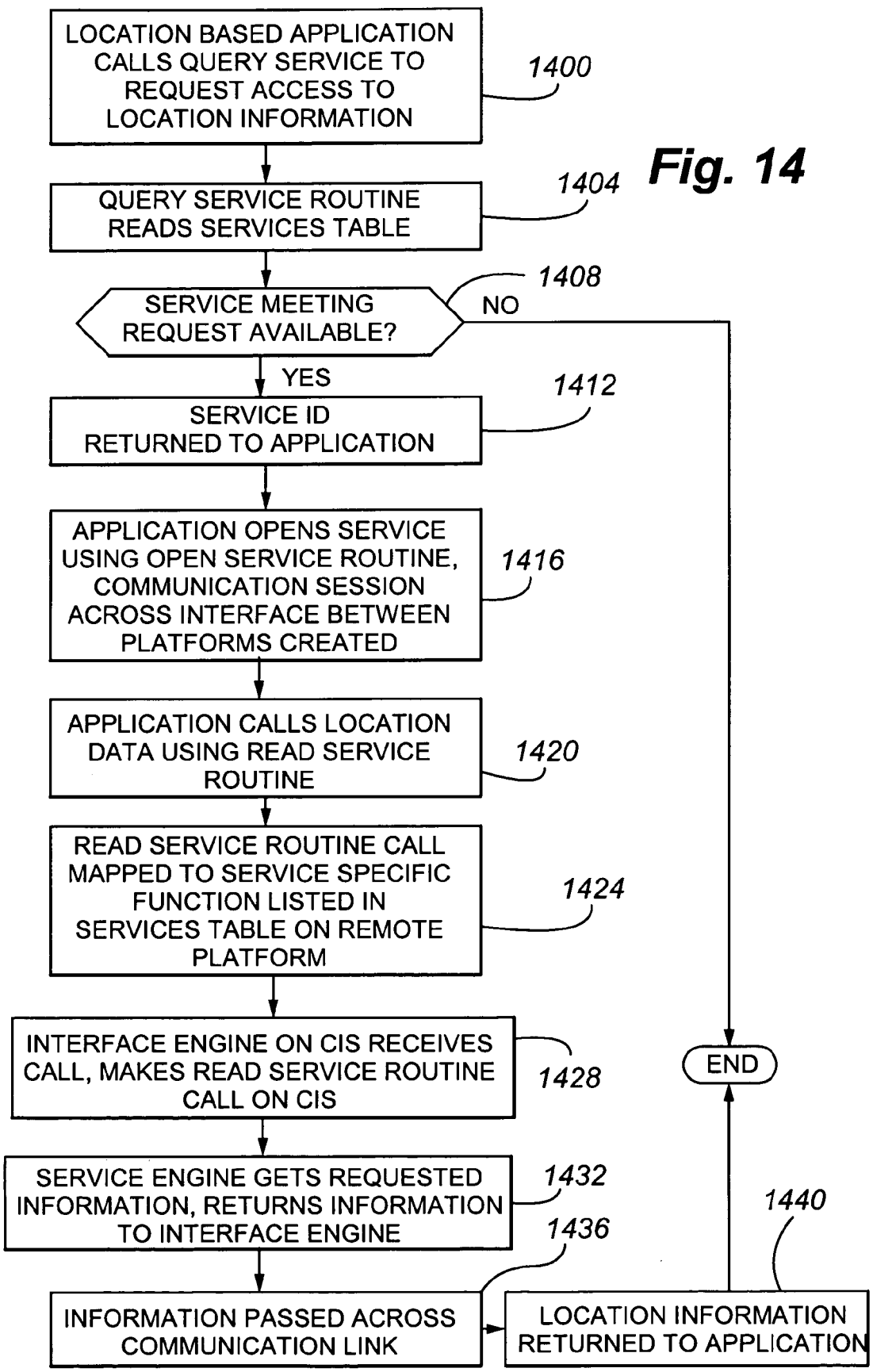
FIG. 14 is a flowchart depicting aspects of the operation of a communications interface system in facilitating access to a service associated with a remote platform in accordance with embodiments of the present invention.

With reference now to FIG. 14, a process for allowing an application 422 running on a remote platform 120 to access a service available from a communications interface system 104 in accordance with embodiments of the present invention is illustrated. In particular, FIG. 14 illustrates a request from a location based application 422 on a remote platform 120 for access to location information available from a GPS receiver 420 associated with the communications interface system 104. Initially, at step 1400, the location based application 422 calls a query service routine to request access to location information. The query service routine reads the services table 404*b* (step 1404). At step 1408, a determination is made as to whether a service meeting the request is available. With respect to a service available through another platform, such as the communications interface system 104, the services table 404*b* will include a reference to such a service if the service was included in a service list message received by the remote platform 120. Provided that the services table 404*b* includes a reference to the requested service, the service will be determined to be available, and a service ID for that service will be returned from the connection framework process 210*b* to the application 422 (step 1412). If a service meeting the request is not available, the process may end.

At step 1416, the application 422, through the connection framework process 210, opens the service using an open service routine, and a communication session across the interface or communication link 916 between the remote platform 120 and the communications interface system 104 is created. The application 422 then calls location data using a read service routine sent directly to the service engine 416 through which the service is available (step 1420). The read service routine call is mapped to a service specific function listed in the services table 404*b* on the remote platform (step 1424). The service specific routine called on the remote platform 120 performs any parameter translation required to conform to the conventions or formats of the platform on which the service engine 416 is running (here the communications interface system 104). In accordance with other embodiments of the present invention, a stream data model according to which application messages are read from and written to a channel that guarantees delivery is used, instead of mapped read and write calls.

The translated parameters or data are transferred to the communications interface system 104 from the remote platform 120 via the communication routines of the normalized communications interface 424 established between the interface engines 908*a* and 908*b*. That is, the interface engines 908 perform the steps required to implement the transmission of the service routine message between the communications interface system 104 and the remote platform 120 using the communications link 916. For example, the interface engines 908 can perform the functions associated with the lower four layers (i.e., the physical through the transport layers) associated with the particular communication link 916 between the interface engines 908. As can be appreciated by one of skill in the art, the particular requirements for such communication are determined by the particular communication link 916. Examples of communication links 916 that may be used to interconnect a communications interface system to a remote platform 120 include USB, Ethernet, and Bluetooth interconnections. In general, any type of wired or wireless interface may be used to establish the connection. Furthermore, as can be appreciated from the description provided herein, by providing suitable interface engines 908, and by appropriately mapping references to resources, a communications interface system 104 and interconnected remote platform 120 are not otherwise required to conform to the particular requirements of the link 916 between the platforms.

At step 1428, the interface engine 908a running on the communications interface system 104 receives the call for location data, and makes a service specific read service routine call to the service engine 416. The service engine 416 then gets the requested location information, and returns it to the interface engine 908a (step 1432). Accordingly, it can be appreciated that, by providing an interface engine 908a running on the communications interface system, the request for information and the response to that request are handled as if the application requesting such information (in the present example the location based application 422) were running on the communications interface system 104 directly.

The interface engine 908a performs any necessary network or host data format translation of the returned information, and generates a results message containing the requested information. The results message is then passed across the communications link 916, and the interface engine 908b running on the remote platform 120 breaks down the network messages and performs any required translation on the results received (step 1436). The requested location information included in the results received is then returned to the requesting application 422 (step 1440). The process may then end.

Figure 15:
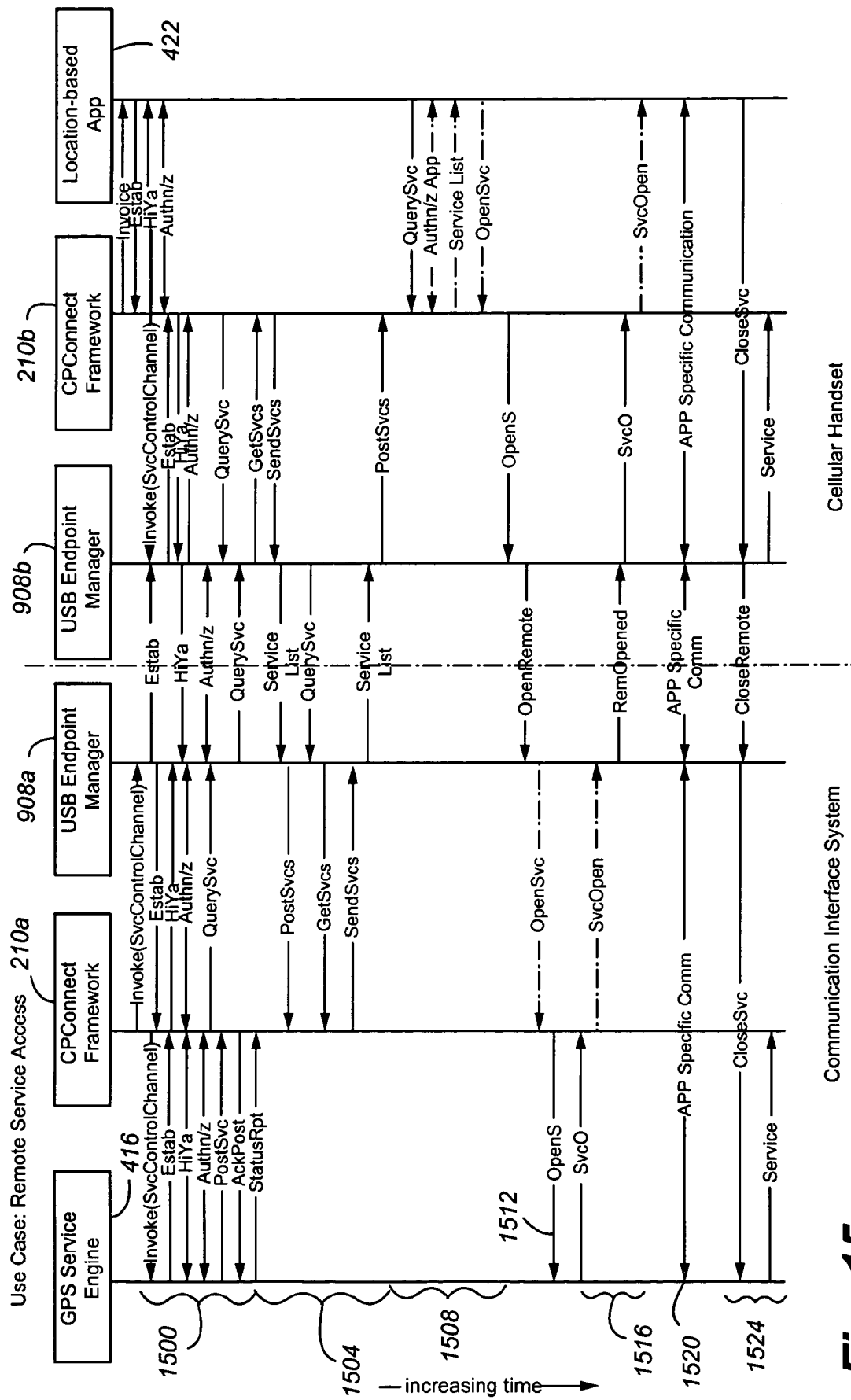
FIG. 15 illustrates communications between elements of a system in accordance with embodiments of the present invention.

With reference now to FIG. 15, a remote service access process scenario is illustrated. In particular, the exchange of messages according to an example in which information from a service running on a communications interface system 104 is passed to an application 422 requesting such information and running on a remote platform 120 is illustrated. More particularly, the present example involves a service engine 416 comprising a GPS service engine 416 passing information to an application comprising a location based application 422 running on a remote platform 120 comprising a cellular handset. Furthermore, in the example of FIG. 15, the communication link 916 between the interface engines 908a and 908b comprises a universal serial bus (USB) communications link.

In general, before the exchange of services can be performed, the services on each platform must be readied through service initiation messages (step 1500) performed on each of the platforms 104 and 120. An exchange of shared services information can then be made by the communications interface system 104 and the remote platform 120 through an exchange of services messages (step 1504). After each platform receives a list of services from the other, the services available on the remote platform are posted in their respective services tables 404.

In the example shown, the location based application 422 then queries for available services, and opens a service meeting the application's requirements (step 1508). The open service message is then transported across the USB communication link, and is eventually received by the service engine 416 (step 1512). The service engine 416 responds with a service open message that is transported across the communication link and eventually delivered to the location based application 422 (step 1516). After the service open message has been received by the location based application 422, application specific communications can begin (step 1520). The application specific communications can include transfer of information, such as GPS data, from the service engine 416 to the location based application 422. Importantly, these communications occur independently, or without further involvement, of the connection framework process 210 of the communications interface system 104. That is, after the communications link is established between the client application 422 and the endpoint manager 908b, and between the service engine 416 and the endpoint manager 908a, the functionalities of the connection framework process 210 are no longer required to have the information transfer or other communications between the service engine 416 and the location based application 422. Also, direct communications occur between the interface engines 908a, 908b. Essentially, these communications, such as information transfers, take place after the communications link is established, as if the connection framework process 210 was not present. When the application 422 no longer requires the location based information, the service is closed, and cleanup is performed (step 1524). Although the present description related to example communication operations after the communications link is established concern a location based application 422 that is executing on a remote platform 120, the independent nature of the communications that occur after the communications link is established are not limited to a remote platform environment. In particular, the same direct connection (i.e., not through a connection framework process) between an application 422 and a service engine 416 exists when the application being executed is not remote from the connection framework process 210, such as an application local to the communications interface system 104. In such a case, like the example just described, the application has direct communications with the service engine or other services independently and without involvement of the connection framework process 210.

Figure 16:
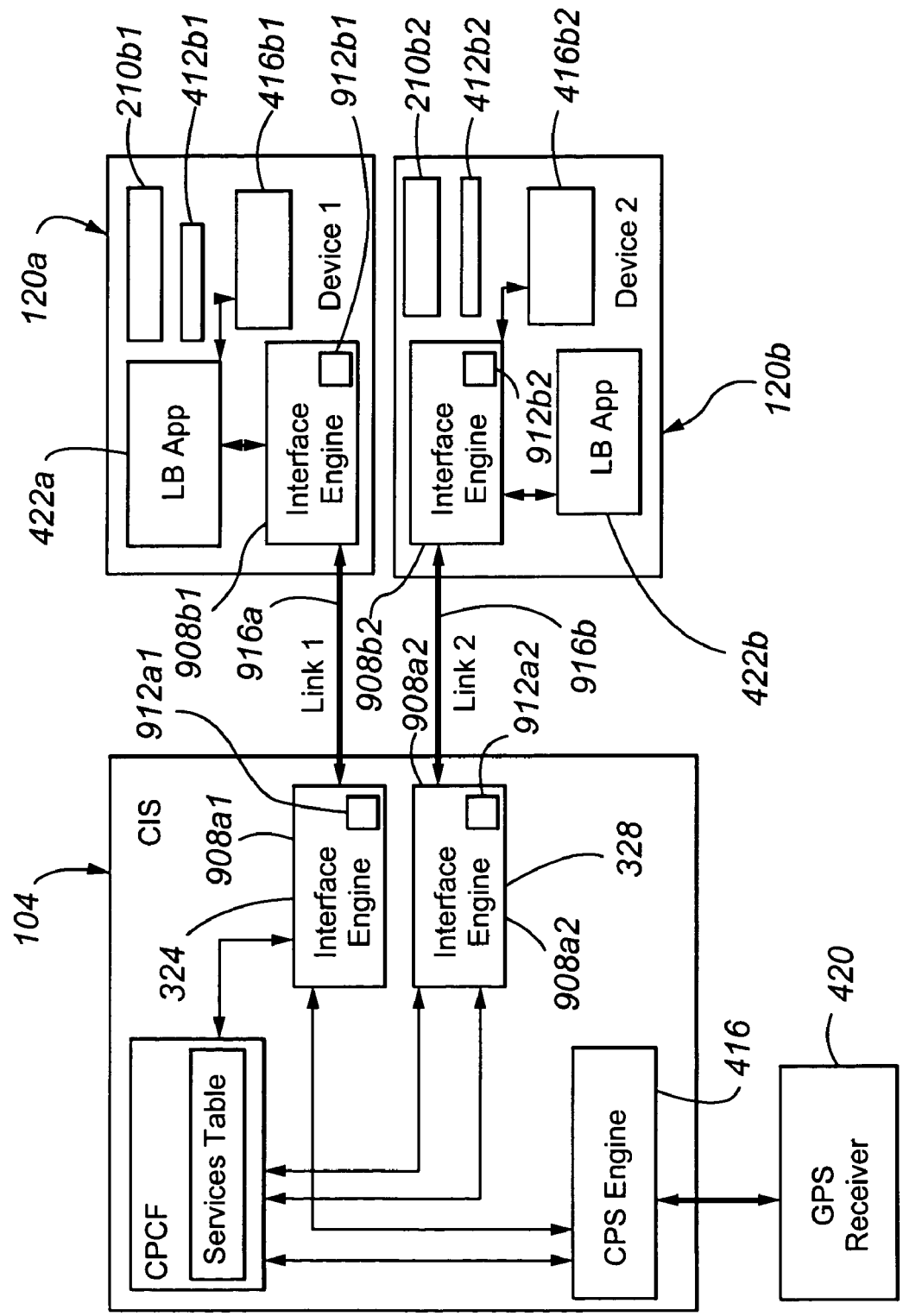
FIG. 16 is a block diagram depicting a communications interface system interconnected to a number of remote platforms in accordance with embodiments of the present invention.

With reference now to FIG. 16, a block diagram of a communications interface system 104 interconnected to multiple remote devices 120a and 120b is illustrated. In the example of FIG. 16, the communications interface system includes first 908a1 and second 908a2 interface engines, each having an associated services map 912a1 and 912a2. Accordingly, the first 916a and second 916b communication links to the first 120a and second 120b remote devices respectively may use different communication link technologies. For example, the first interface engine 908a1 could comprise a wired interface 324, and the second interface engine 912a2 could comprise a wireless interface 328. As also shown, the communications interface system may continue to provide service engines 416b1 and 416b2, which may or may not operate in cooperation with devices 420 directly interconnected to the communications interface system 104.

Each of the remote platforms 120 generally provides an interface engine 908b1 and 908b2 and an associated services map 912b1 and 912b2. Also, because they function as full remote platforms 120, they each include a connection framework process 210b1 and 210b2. The connection framework processes 210b on the remote platforms 120 each include a services table 404, event table 408 and service initiation table 410 (not shown in FIG. 16). In addition, each remote platform includes a service event interface 412b1 and 412b2. The remote platforms 120 may also support client applications 416b1 and 416b2.

In general, the operation of a system in which a communications interface system 104 is interconnected to multiple remote platforms 120 is the same as for the case in which a single remote platform 120 is used. In particular, multiple remote platforms 120 can be accommodated by providing an appropriate interface engine 908 to support the communication link 916 used by each remote platform 120. Furthermore, it should be appreciated that, where the communication links 916 used by multiple remote platforms 120 are the same, and where such link can support multiple platforms, a single interface engine 908a may support multiple remote platforms 120.

The services table 404 maintained by a connection framework process 210 in accordance with embodiments of the present invention contains records related to services available, either through a communications interface system 104 or through an interconnected remote platform 120. In connection with maintaining such information, the services table 404 associated with a communications interface system 104 or a remote platform 120 may include a static service table record 1700 (see FIG. 17A) for each service available to the communication interface system 104a or remote platform 120. Each record 1700 may provide a number of fields, identified by a field name 1704. A record 1700 may also include information corresponding to each field name 1704, such as the data type 1708 and the field description 1712. For example, a name field may specify the name of the managed application and a service executable field may specify the executable image to be invoked. A start time field may be provided specifying whether the application is to be started on boot or on demand. An executable ID field specifies a unique ID for the executable image. Service class and service type fields are also provided to further categorize the available service and an ancillary field may be provided for further service description information. A maximum references field specifies the maximum number of simultaneous connections to the service. A remote access field specifies whether access from an application on a remote platform is permitted or not. A status frequency field may be provided for specifying the status of connection framework process monitoring, and a status timeout field specifies the maximum time allowed to respond to a status request. A restart policy field specifies the action taken in response to a timeout. For example, an application may terminate on status response timeout, or the application may restart. A privileges field may be provided to specify the privileges required for a client to connect to the service.

With reference now to FIG. 17B, fields that may be provided as part of a dynamic service table record 1716 maintained as part of the services table 404 are illustrated. Examples of such fields that may be maintained as part of a dynamic service table record 1716 include a service ID assigned to the service. A field containing the current number of connections to the service may also be provided. In addition, the control channel through which the connection framework process 210 communicates with the service engine 416 providing the service may be provided. A service state field may be included as part of the dynamic service table record 1716 to indicate whether a service is not invoked, invoked, running or not responding. Accordingly, it can be appreciated that a record included in a dynamic service table record contains fields for information regarding a service that change during the normal operation of a system 100. Furthermore, it can be appreciated that the static service table records 1700 contain information that is infrequently changed, and that provides a starting point for the operation of applications and services. As can be appreciated by one of skill in the art from the description provided herein, a static service table record 1700 may be stored in non-volatile memory, while a dynamic service table record 1716 may be stored in volatile memory. Furthermore, the static and dynamic records may be maintained as a single combined record.

Examples of fields that may be included in a dynamic service table record 1716 include a service ID field to specify the service identifier of the service to which the record 1716 pertains. A service class field may specify the class to which the particular service belongs, while a service type field specifies the service type. A reference count field may be provided to indicate the number of connections (e.g., from separate applications 422) that are currently connected to the service. A maximum references field may be provided to indicate the maximum number of simultaneous connections to the service that can be maintained at any one time. A field may also be provided for indicating whether remote access to the service is permitted. In order to identify the control channel that can be used by the connection framework process 210 to communicate with the service engine providing the service, a control type field may be provided. As an additional example, a service state field may be provided to indicate the current service state of the service. Appropriate values for the fields may be specified by the data type 1708 associated with each field. For example, data types 1708 can be data words or Boolean strings.

The service initiation table 410 contains information regarding service engines that are local to the platform (i.e., the communications interface system 104 or the remote platform 120 on which the service initiation table 410 under consideration is established). In general, each service initiation table 410 may contain a record for each service engine on the platform 104 or 120. With reference now to FIG. 18, an example record 1800 in a service initiation table 410 is depicted. Each record 1800 may include a number of fields identified by a field name 1804, data type 1808, and a field description 1812. Individual fields may include a service engine field identifying the service engine to which the record 1800 pertains by name, and a service executable field that provides a reference to the executable file of the service engine. A start time field may be provided for indicating whether the executable is to be started on boot up or on demand (i.e., in response to a service request). A status frequency field may be provided to indicate the frequency with which the communication framework process 210 is to monitor the status of the service. Fields for specifying the service class and service type may also be included. In addition, a status response field indicating the maximum time that the service is allowed to respond to a status request may be provided. As an additional example, a restart policy field indicating the action to be taken if the service fails to respond to a status request within the maximum specified time may be indicated.

Figure 19:
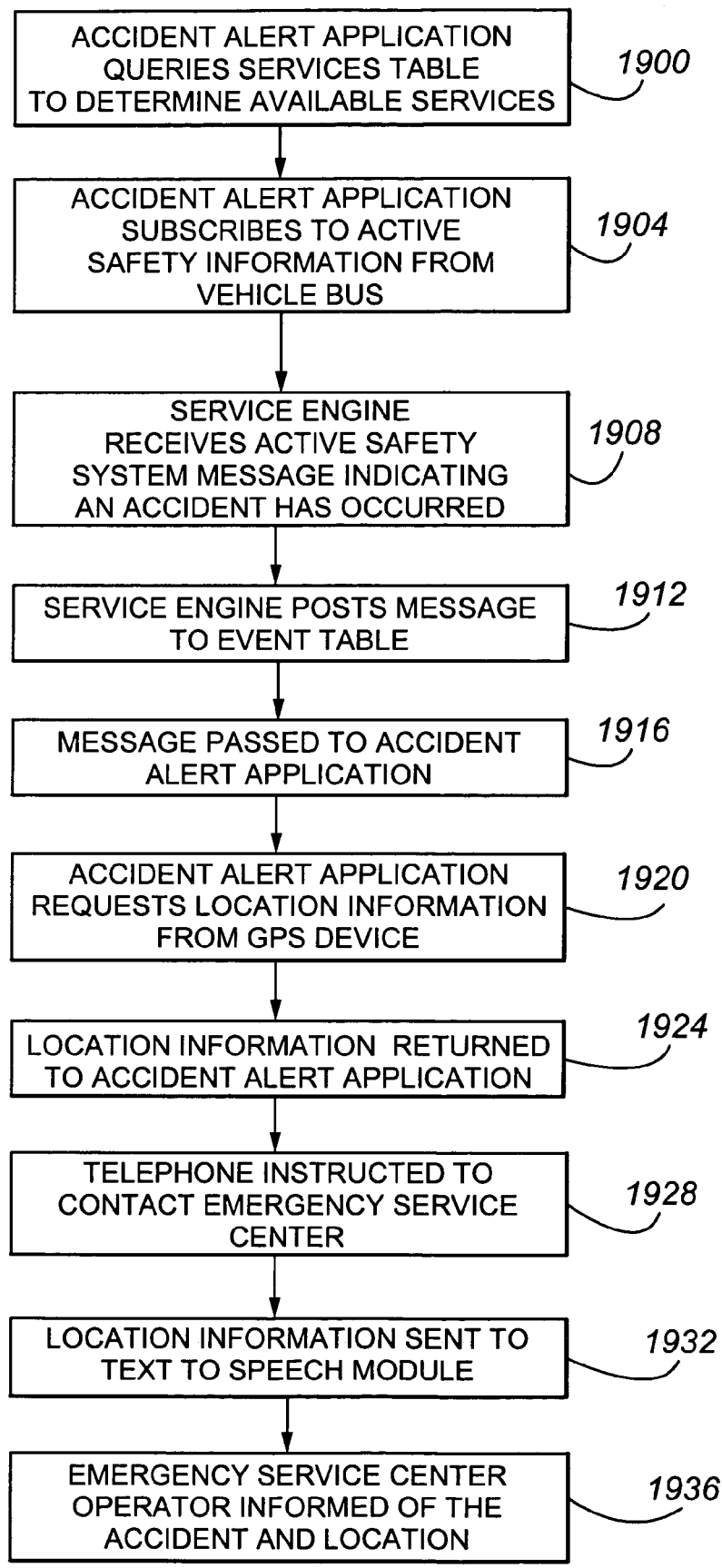
FIG. 19 is a flowchart depicting aspects of the operation of a communications interface system in accordance with embodiments of the present invention in connection with an exemplary scenario.

With reference now to FIG. 19, an example scenario involving the use of a communications interface system 104 in accordance with an embodiment of the present invention in facilitating the exchange of information between various devices is illustrated. Initially, at step 1900, an accident alert application 422 running on the communications interface system 104 queries the services table 404 to determine available services. At step 1904, the accident alert application 422 subscribes to active safety information available from the vehicle bus through an OBD-II vehicle accident service engine 416. In particular, the vehicle accident detector service engine 416 may operate in conjunction with a port, for example provided as part of a daughter card, that provides a physical interconnection to the vehicle bus at an OBD-II interface 420. In addition, the accident alert application 422 subscribes to communications services available from a cellular telephone 124. As can be appreciated from the description provided herein, the cellular telephone 124 may comprise a remote platform 120 interconnected to the communications interface system 104 through a normalized communication interface 424. Alternatively, the cellular telephone 124 may be interconnected to the communications interface system 104 through a service engine 416, for example where the cellular telephone 124 is interconnected through a specially provided adaptor or port.

At step 1908, the vehicle accident detector service engine 416 receives an accident indication from the vehicle bus. Such accident indication may be in the form of, for example, an active safety system indication that an airbag has been ignited. At step 1912, the vehicle accident detector service engine 416 posts the message to the event table 408 maintained by the connection framework process 210. As a registered subscriber for accident messages, the accident message posted by the vehicle accident detector service engine 416 is passed to the accident alert application 422 (step 1916).

At step 1920, the accident alert application requests location information from the GPS device 420 that is interconnected to the communications interface system 104 through a Bluetooth wireless interface at a GPS service engine 416. The request is formatted as required by the GPS service engine 416 and passed to the GPS service engine 416. At step 1924, the requested information is returned to the accident alert application.

At step 1928, the accident alert application 422 instructs the telephone 124 interconnected to the communications interface system 104 to dial an emergency service center. The accident alert application 422 sends the location information to a text to speech module (step 1932), and the location of the vehicle is passed to an emergency service center operator verbally (step 1936).

From the example scenario presented in connection with FIG. 19, it can be appreciated that embodiments of the present invention may aggregate available services using a number of different communication links to provide enhanced user services. Furthermore, apart from sending and receiving messages required to advertise and subscribe to services and events, applications and services do not need to be specially adapted to interoperate through or in connection with the communications interface system. Furthermore, it can be appreciated that devices can communicate with one another through the communications interface system 104 using their native communication capabilities. In particular, by providing a number of different communication interfaces by which devices or remote platforms may communicate with the communications interface system 104, such as wired interfaces 324 or wireless interfaces 328, a number of different communication link technologies can be supported.

Figure 20:
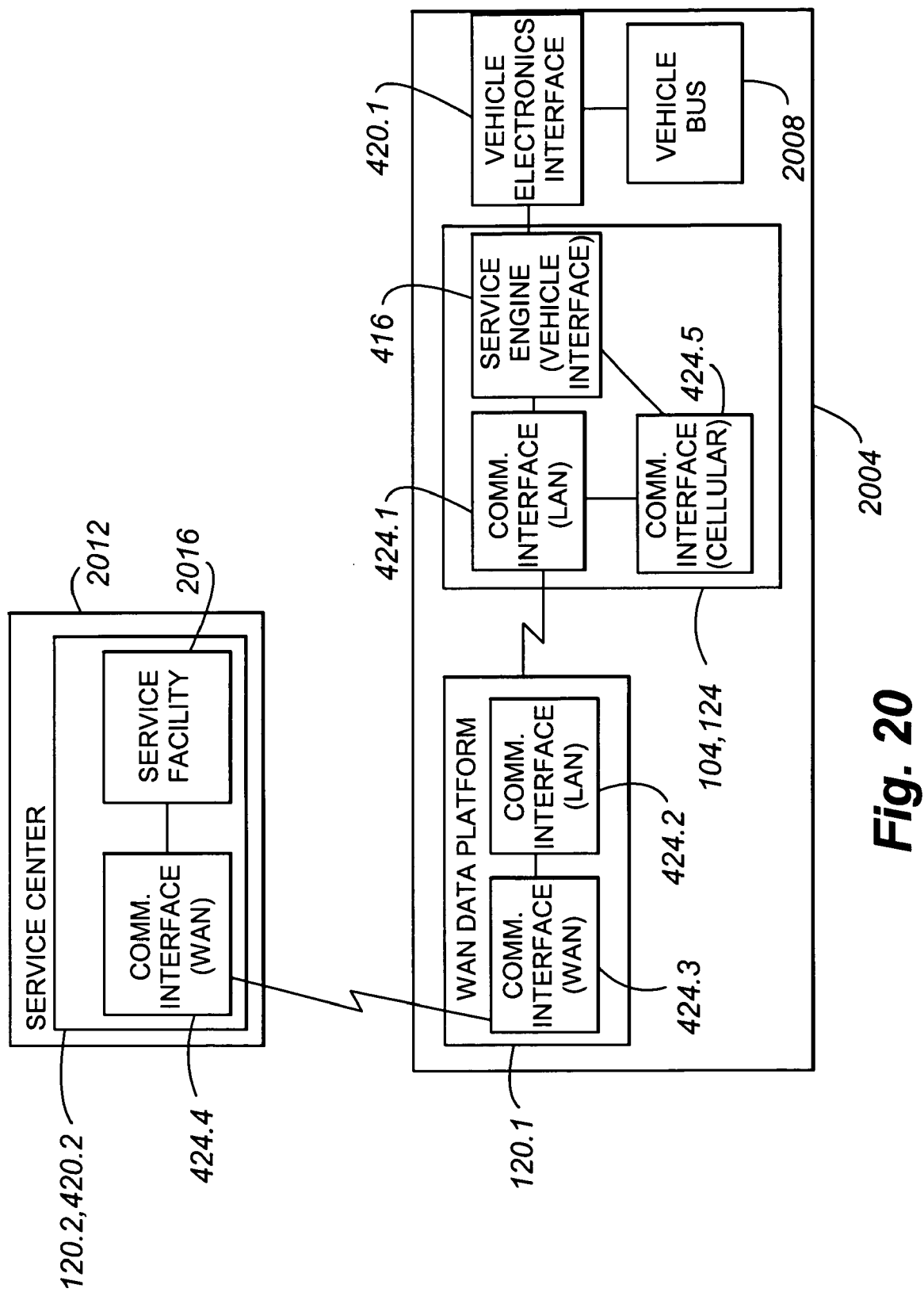
FIG. 20 depicts a communications interface system in accordance with embodiments of the present invention in an exemplary application.

With reference now to FIG. 20, the use of a communications interface system 104 in an exemplary scenario according to which operating parameters associated with the vehicle are provided to a remote service center for diagnostic purposes is illustrated. In particular, a communication interface system 104 located within a vehicle 2004 is interconnected to the vehicle bus 2008 through a device 420.1 comprising a vehicle electronics interface, such as an OBD-II interface. A service engine 416 provided as part of the communications interface system 104 is provided for the vehicle electronics interface 420.1.

Data obtained from the vehicle bus 2008 may be provided by the service engine 420.1 to a communications interface 420.1 comprising a local area network (LAN interface), and passed by the LAN interface 424.1 to a remote platform 120.1. The remote platform 120.1 may comprise a wide area network data platform. The remote platform 120.1 includes a communications interface 424.2 that is complementary to the LAN interface 424.1. From the LAN interface 424.2 on the WAN data platform 120.1, the data that was obtained from the vehicle bus 2008 may be passed to a communications interface 424.3 comprising a wide area network interface (WAN interface), also on the WAN data platform 120.1.

The WAN interface 424.3 may then transmit the data to a complementary communication interface 424.4 associated with a service center 2012. Furthermore, the communications interface 424.4 or WAN interface associated with the service center 2012 may be provided as part of a remote platform 120.2 (i.e., a connection framework process 210 enabled platform). Alternatively, the communications interface 424.4 associated with the service center 2012 may comprise a device 420.2, in which case the WAN interface 424.3 of the WAN data platform 120.1 in the vehicle 2004 is in communication with that platform's local area network communication interface 424.2 through a service engine 416 (not shown in FIG. 20). From the wide area network interface 424 associated with the service center 2012, the data obtained from the vehicle bus 2008 is provided to a service facility 2016. The service facility may be part of a device 420.2 incorporating the WAN interface 424.4, or may interconnect to a remote platform 120.2 as a separate device 420.

The communications interface system 104 may comprise a connection framework process 210 enabled cellular telephone 124, in which case the communications interface system 104 may include a cellular telephone communications interface 424.5. As can be appreciated by one of skill in the art from the description provided herein, such a cellular communication interface 424.5 may provide an alternate means for delivering data from the vehicle bus 2008 to a service center 2012.

Various communication link technologies may be associated with the described communication interfaces 424 in connection with FIG. 20. For instance, in addition to a cellular communication interface 424.5, a communications interface system 104 may include a local area network communication interface 424.1 comprising a wireless local area network, such as a WiFi interface. In general, the local area network interface 424.2 associated with the remote platform 120.1 supports the communication link technology applied by the local area network interface 424.1 of the communications interface system 104. Accordingly, continuing the present example, the local area network interface 424.2 of the remote platform 120.1 may comprise a wireless local area network, such as WiFi. Examples of communication link technologies used by a wide area network interface 424.3 provided as part of a remote platform 120.1 include WiMax or WiMobile. The wide area network interface 424.4 associated with the service center 2012 may then support the communication link technology of the wide area network interface 424.4 of the remote platform 120.1.

As can be appreciated by one of skill in the art, various components, such as connection framework processes 210 or service engines 416 that may be associated with communications interface systems 104 or remote platforms 120 have been omitted from FIG. 20 for clarity of the associated description. However, such components may be included, as described elsewhere herein. In addition, it should be appreciated that communications between a service center 2012 and a vehicle bus 2008 may be bi-directional. For example, in response to data regarding vehicle parameters provided to the service center 2012, the service center 2012 may issue instructions that result in a modification of the operation of the vehicle 2004.

From the description provided herein, it can also be appreciated that a communications interface system 104 may function as a hub enabling the interoperation of, including the exchange of data between, different devices and/or applications. Furthermore, when used in connection with one or more remote platforms, a number of such hubs may be interconnected.

Although various examples provided herein have described the deployment of communications interface systems 104 in vehicles, it should be appreciated that the present invention is not so limited. In particular, embodiments of the present invention may be deployed in or adapted for any use where interoperability between devices and applications, without requiring extensive prearrangement of protocols and messages, is desired. For example, communications interface system 104 functionality as described herein may be usefully deployed in connection with stationary or mobile work stations to provide flexible capabilities as devices available to the communications interface system 104 change.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. An information transfer apparatus, comprising:
a central system for managing service related information related to services available for use including a first service, the central system including a connection framework process that provides a services table;
at least a first application that processes application related information;
at least a first service engine having said first service associated therewith and being in communication with said central system for providing at least a first function to be used by said first application;
at least a first information source in communication with said first service engine from which said application related information can be obtained and provided via said first service engine to said first application for processing using said first application, wherein at least said first service is listed in said services table, wherein said at least a first service is advertised by a services list including at least a portion of said services table, and wherein said first service is discovered by said first application from said services list; and
at least a first communication interface in communication with at least each of said central system and said first service engine, said first communication interface for providing compatibility of communications between said central system and communications link technology communicable with said first communication interface;
wherein said central system is used to establish a first communications path for said first communication interface to said first service engine by providing said first communication interface with information for connecting to said first service and the communication interface storing the information for connecting to said first service in a services map and, after a communication channel between said first communication interface and said first service being established, said first communication interface is used in obtaining said application related information from said information source and providing said application related information to said first application using said communication channel, wherein said communication channel does not include said connection framework process.

2. The apparatus of claim 1 wherein said central system also communicates with said first service engine to obtain state information therefrom and also to alert said first service engine of a communication between said first service engine and said first application.

3. The apparatus of claim 1 in which said first communication interface communicates with said first service engine using said first application.

4. The apparatus of claim 1 further including a second application executable on an external system that can use said first communication interface to access said first service engine.

5. The apparatus of claim 1 wherein said central system includes an operating system, a controller having at least one processor and memory, with at least portions of said memory storing said service related information for use by at least a second application.

6. The apparatus of claim 1 wherein said first application includes a vehicle diagnostic application that communicates directly with said central system.

7. The apparatus of claim 1 wherein said first service engine associates with at least one of: a global positioning system (GPS), Media Oriented Systems Transport (MOST), an onboard vehicle diagnostics (OBD-ll), a controller area network (CAN), and a universal serial bus (USB).

8. The apparatus of claim 1 wherein said communications link technology includes at least one of: a universal serial bus (USB), transport control protocol/universal datagram protocol (TCP/UDP), a controller area network (CAN) and a RS-232 serial port.

9. The apparatus of claim 1 wherein said communications link technology involves wireless technology and relates to at least one of: WiFi, ultra wideband (UWB) Bluetooth, personal area networking, COMA, DATATAC, GSM/GPRS/EDGE, UMTS, Mobitex and an integrated digital enhanced network interface.

10. The apparatus of claim 1 wherein said first communication interface receives a message from said central system and uses said message to create said services map that maps said first service to a first communication port assigned by said first communication interface.

11. The apparatus of claim 1 wherein said first communication interface provides a message to an external system indicating that said first service is available and also indicating the manner by which said first service is to be referenced by said external system.

12. The apparatus of claim 1 wherein said first interface manager creates a mapping table that correlates at least a first remote service associated with an external system to a second communication path used to access said first information source through first service engine.

13. The apparatus of claim 1 further including a second communication interface included with an external system that communicates with said first communication interface using said communications link technology, said second communication interface sending a message to said first communication interface manager that includes an identifier associated with a first remote service engine of said external system, said first communication interface correlating an address with said first remote service engine.

14. The apparatus of claim 13 wherein said first communication interface maps said address to said communications link technology.

15. The apparatus of claim 14 wherein said communications link technology relates to at least one of: a universal serial bus (USB), a transport control protocol/universal datagram protocol (TCP/UDP), a controller area network (CAN) and a RS-232 serial port.

16. The apparatus of claim 13 wherein said second communication interface stores information related to mapping said first remote service engine to said address.

17. The apparatus of claim 1 further including an external system that manages remote services information including related to at least a first remote service available for use and in which said external system informs said central system of said at least first remote service and said central system informs said external system of said first service.

18. The apparatus of claim 1 wherein said central system is part of a portable phone.

19. An information transfer apparatus, comprising:
a central system for managing local services information including related to at least a first local service available for use, the central system including a connection framework process providing a services table having a number of references. wherein each reference identifies a service and access information for the service;
at least a first local service engine associated with said first local service in communication with said central system;
at least a first information source in communication with said first service engine from which first information related to said first local service can be obtained;
at least a first application for processing said first information, wherein the first application is provided with a services list by the connection framework process that includes at least some of the references listed in the services table;
a local communication interface in communication with at least said central system for providing compatibility between said central system and a communications link technology; and
a remote communication interface in communication with said local communication interface and being associated with said communications link technology, said remote communication interface being part of an external system having at least a first remote service available for uses,
wherein the number of references includes a reference to the first local service, wherein the number of references includes a reference to the first remote service, wherein at least the first local service and the first remote service are advertised to the first application by the services list, wherein the first application uses information contained in the services table to establish a communication channel to access at least one of the first local service and the first remote service, and wherein the communication channel used by the first application to access said at least one of the first local service and the first remote service does not pass through the connection framework process.

20. The apparatus of claim 19 wherein said first application is part of said external system and in which said first application obtains said first information for processing using said remote communication interface and said local communication interface, wherein the remote communication interface obtains a copy of the services table from the central system via the local communication interface, and wherein the first application is provided with a copy of the services table by the remote communication interface.

21. The apparatus of claim 19 wherein said first application communicates directly with said central system and is not part of said external system and in which said first application obtains said first information for processing using said first service engine.

22. The apparatus of claim 19 wherein said first application is not part of said external system.

23. The apparatus of claim 19 wherein said external system informs said central system of said at least first remote service being available for use and said central system informs said external system of said at least first local service being available for use.

24. A method for communicating using a central system, a first service engine in communication with said central system, a first application in communication with said central system and said first service engine, a connection framework process, and a first information resource for providing first information, comprising:
said first service engine sending a post services message to said connection framework process to report services available from said first information resource through said first service engine, said services including at least a first service operable to provide said first information;
listing an identification of and access information for the first service in a services table:
invoking said first application to be used in processing said first information;
discovering the first service by said first application, wherein said discovering includes sending an establish message to said connection framework process over a public control channel, wherein a channel for direct communication between the connection framework process and said first application is established, wherein said first application sends a query services message to the connection framework process, and wherein said first application is provided with a services list message from the connection framework process that includes a list of services that are available to the first application;
the first application identifying the first service in the service list and requesting the first service;
in response to the request for the first service, the first service engine creating a service instance communication channel to enable the first application to access the first service and communicating an identification of the service instance communication channel to the connection framework process, wherein the connection framework process provides the identification of the service instance communication channel to the first application;
communicating directly said first information from said first service engine to said first application, after said establishing, using said service instance communication channel independently of said connection framework process.

25. The method of claim 24 further including providing a local communication interface in communication with at least the central system for providing compatibility of communication between the central system and communications link technology for establishing a communications connection to an external system and in which the method further includes assigning at least the first service engine an identifier that can be used by said external system when using said first local service.

26. The method of claim 25 wherein said local communication interface stores information that correlates at least a first remote service included with said external system and a first local communications path that is not part of said external system.

27. The method of claim 26 further including providing a remote communication interface in communication with said local communication interface and in which said remote communication interface stores information correlating said first remote service with said first local communications path and also stores information correlating said first local service with a second local communications path that is not part of said external system.

28. The method of claim 24, wherein the query services message sent by the first application to the connection framework process specifies a requested service.

29. The method of claim 24, wherein the services table includes services that the first application is not authorized to access, and wherein the service list message does not list any services that the first application is not authorized to access.

30. An information transfer apparatus, comprising:
a central system for managing information related to a number of services;
a number of service engines, wherein at least one of the number of services is associated with each of the number of service engines;
a services table, wherein an entry for each of the number of services is included in the services table, the services table including:
for each service included in the number of services, an identification of the service,
for each service included in the number of services, information needed to establish a connection to the service,
wherein the services table advertises the number of services;
a communication interface, wherein the communication interface provides access to the services table, wherein the communication interface provides for discovery of a first service included in the number of services from the services table, and wherein the communication interface provides access to the first service.

31. The apparatus of claim 30, further comprising:
an application, wherein the application discovers the first service through the services table, wherein following the discovery the application is in communication with a first service engine included in the number of service engines that is associated with the first service, and wherein the application at least one of: 1) receives information from the first service via the first service engine included in the number of service engines, and 2) provides information to the first service via the first service engine included in the number of service engines.

32. The apparatus of claim 31, wherein the application accesses the services table and the first service engine through the communication interface.

33. The apparatus of claim 32, wherein the services table is accessed by the application through the communication interface using a first communication path, and wherein the number of services are accessed by the application through the communication interface using a second communication path.

34. The apparatus of claim 31, further comprising:
a first port, wherein the first service at least one of provides information to and receives information from the first service engine through the first port.

* * * * *

UNITED STATES PATENT AND TRADEMARK OFFICE
CERTIFICATE OF CORRECTION

PATENT NO. : 7,346,370 B2  Page 1 of 1
APPLICATION NO. : 10/836939
DATED : March 18, 2008
INVENTOR(S) : Spaur et al.

It is certified that error appears in the above-identified patent and that said Letters Patent is hereby corrected as shown below:

In Claim 10
Column 33,
Line 36, delete "." and insert -- , -- therefor;
Line 58, delete "uses" and insert -- use -- therefor;

In Claim 24
Column 34,
Line 39, delete ":" and insert -- ; -- therefor.

Signed and Sealed this

Tenth Day of June, 2008

JON W. DUDAS
*Director of the United States Patent and Trademark Office*